US012720599B2

(12) United States Patent
Liang et al.

(10) Patent No.: US 12,720,599 B2
(45) Date of Patent: Aug. 25, 2026

(54) METHOD PERFORMED BY A USER EQUIPMENT, METHOD PEFORMED BY AN ACCESS NETWORK NODE, A USER EQUIPMENT AND AN ACCESS NETWORK NODE FOR LISTEN-BEFORE-TALK PROCEDURE

(71) Applicant: NEC Corporation, Tokyo (JP)

(72) Inventors: Caroline Liang, London (GB); Robert Arnott, London (GB); Takahiro Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 560 days.

(21) Appl. No.: 18/024,876

(22) PCT Filed: Oct. 14, 2021

(86) PCT No.: PCT/JP2021/038031
§ 371 (c)(1),
(2) Date: Mar. 6, 2023

(87) PCT Pub. No.: WO2022/080449
PCT Pub. Date: Apr. 21, 2022

(65) Prior Publication Data

US 2023/0363002 A1 Nov. 9, 2023

(30) Foreign Application Priority Data

Oct. 16, 2020 (GB) ..................................... 2016472

(51) Int. Cl.
*H04W 74/0808* (2024.01)
*H04W 16/14* (2009.01)

(52) U.S. Cl.
CPC ....... *H04W 74/0825* (2013.01); *H04W 16/14* (2013.01)

(58) Field of Classification Search
CPC ............. H04W 74/0825; H04W 16/14; H04W 74/0808
See application file for complete search history.

(56) References Cited

U.S. PATENT DOCUMENTS

2016/0323915 A1 11/2016 Liu et al.
2017/0303159 A1 10/2017 Ma et al.
(Continued)

FOREIGN PATENT DOCUMENTS

CN 106162658 A 11/2016
CN 107409419 A 11/2017
(Continued)

OTHER PUBLICATIONS

JP Office Action for JP Application No. 2023-515821, mailed on Feb. 20, 2024 with English Translation.
(Continued)

*Primary Examiner* — Sulaiman Nooristany
(74) *Attorney, Agent, or Firm* — Sughrue Mion, PLLC

(57) ABSTRACT

A method is disclosed in which a user equipment (UE) that communicates with a radio access network (RAN) maintains information for configuring timing of fixed frame period (FFPs) for a listen-before-talk (LBT) procedure. When the UE has data to be transmitted, it performs a clear channel assessment, CCA, to determine if a communication channel is clear. When the CCA indicates that the communication channel is clear a channel occupancy time, COT, is initiated for the UE within a subsequent FFP and transmission of the data commences. However, transmission of the data ceases following receipt of an indication, from a node of the RAN, that the transmission should be stopped.

16 Claims, 8 Drawing Sheets

(56) References Cited

U.S. PATENT DOCUMENTS

| | | | | |
|---|---|---|---|---|
| 2018/0242364 | A1 | 8/2018 | Park et al. | |
| 2019/0274062 | A1 | 9/2019 | Ma et al. | |
| 2020/0100289 | A1 | 3/2020 | Park et al. | |
| 2020/0281008 | A1 | 9/2020 | Aboul-Magd et al. | |
| 2020/0305191 | A1* | 9/2020 | Moon | H04W 72/23 |
| 2021/0127423 | A1 | 4/2021 | Park et al. | |
| 2021/0144799 | A1* | 5/2021 | Babaei | H04W 72/23 |
| 2021/0385863 | A1 | 12/2021 | Fan et al. | |
| 2022/0061088 | A1* | 2/2022 | Damnjanovic | H04W 74/08 |
| 2023/0199833 | A1* | 6/2023 | Xu | H04W 74/0808 370/329 |

FOREIGN PATENT DOCUMENTS

| | | | |
|---|---|---|---|
| EP | 3340725 | A1 | 6/2018 |
| JP | 2017-537498 | A | 12/2017 |
| JP | 2018-530195 | A | 10/2018 |
| JP | 2022-521326 | A | 4/2022 |
| WO | 2016/071741 | A1 | 5/2016 |
| WO | 2020/169071 | A1 | 8/2020 |
| WO | 2020/173322 | A1 | 9/2020 |
| WO | 2021/195649 | A2 | 9/2021 |

OTHER PUBLICATIONS

International Search Report for PCT Application No. PCT/JP2021/038031, mailed on Apr. 8, 2022.

Written opinion for PCT Application No. PCT/JP2021/038031, mailed on Apr. 8, 2022.

Search report dated Apr. 7, 2021 for GB2016472.9.

The Next Generation Mobile Networks (NGMN) Alliance, "NGMN 5G White Paper", V1.0, Feb. 2015.

"3rd Generation Partnership Project; Technical Specification Group Radio Access Network; NR; NR and NG-RAN Overall Description; Stage 2 (Release 16)", 3GPP Technical Specification (TS) 38.300 V16.3.0, Sep. 2020.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.3.0, Sep. 2020.

Moderator(Ericsson): "Summary#5 on enhancements for unlicensed band URLLC/IIoT for R17"; 3GPP Draft; R1-2007391, Aug. 2020.

NEC: "Enhancements for unlicensed band URLLC/IIOT"; 3GPP Draft; R1-2008891, Oct. 2020.

JP Office Action for JP Application No. 2023-515821, mailed on Jul. 23, 2024 with English Translation.

CN Office Action for CN Application No. 202180062135.9, mailed on Feb. 15, 2026 with English Translation.

* cited by examiner

METHOD PERFORMED BY A USER EQUIPMENT, METHOD PEFORMED BY AN ACCESS NETWORK NODE, A USER EQUIPMENT AND AN ACCESS NETWORK NODE FOR LISTEN-BEFORE-TALK PROCEDURE

This application is a National Stage Entry of PCT/JP2021/038031 filed on Oct. 14, 2021, which claims priority from British Patent Application 2016472.9 filed on Oct. 16, 2020, the contents of all of which are incorporated herein by reference, in their entirety.

TECHNICAL FIELD

The present invention relates to a wireless communication system and devices thereof operating according to the 3rd Generation Partnership Project (3GPP) standards or equivalents or derivatives thereof. The disclosure has particular, but not exclusive, relevance to improvements relating to user equipment (UE) initiated access to unlicensed spectrum using a Listen-Before-Talk (LBT) approach.

BACKGROUND ART

The latest developments of the 3GPP standards are the so-called '5G' or 'New Radio' (NR) standards which refer to an evolving communication technology that is expected to support a variety of applications and services such as Machine Type Communications (MTC), Internet of Things (IoT)/Industrial Internet of Things (IIoT) communications, vehicular communications and autonomous cars, high resolution video streaming, smart city services, and/or the like. 3GPP intends to support 5G by way of the so-called 3GPP Next Generation (NextGen) radio access network (RAN) and the 3GPP NextGen core (NGC) network. Various details of 5G networks are described in, for example, the 'NGMN 5G White Paper' V1.0 by the Next Generation Mobile Networks (NGMN) Alliance, which document is available from https://www.ngmn.org/5g-white-paper.html.

End-user communication devices are commonly referred to as User Equipment (UE) which may be operated by a human or include automated (MTC/IoT/IIoT) devices. For simplicity, the present application will use the term mobile device, user device, or UE to refer to any communication device that is able to connect to the core network via one or more base stations. Whilst a base station of a 5G/NR communication system is commonly referred to as a New Radio Base Station ('NR-BS') or as a 'gNB' it will be appreciated that they may be referred to using the term 'eNB' (or 5G/NR eNB) which is more typically associated with Long Term Evolution (LTE) base stations (also commonly referred to as '4G' base stations). 3GPP Technical Specification (TS) 38.300 V16.3.0 and TS 37.340 V16.3.0 define the following nodes, amongst others:

gNB: node providing NR user plane and control plane protocol terminations towards the UE, and connected via the NG interface to the 5G core network (5GC).

ng-eNB: node providing Evolved Universal Terrestrial Radio Access (E-UTRA) user plane and control plane protocol terminations towards the UE, and connected via the NG interface to the 5GC.

En-gNB: node providing NR user plane and control plane protocol terminations towards the UE, and acting as Secondary Node in E-UTRA-NR Dual Connectivity (EN-DC).

NG-RAN node: either a gNB or an ng-eNB.

3GPP also defined the so-called 'Xn' interface as the network interface between neighbouring NG-RAN nodes.

The Physical Uplink Control Channel (PUCCH) carries a set of information called Uplink Control Information (UCI). The format of the PUCCH depends on what kind of information the UCI carries. The PUCCH format to be used is determined by how many bits of information should be carried and how many symbols are assigned. The UCI used in NR (5G) includes one or more of the following information: Channel State Information (CSI); ACK/NAK; and Scheduling Request (SR). This is generally the same as in LTE (4G).

The next-generation mobile networks support diversified service requirements, which have been classified into three categories by the International Telecommunication Union (ITU): Enhanced Mobile Broadband (eMBB); Ultra-Reliable and Low-Latency Communications (URLLC); and Massive Machine Type Communications (mMTC). eMBB aims to provide enhanced support of conventional mobile broadband, with focus on services requiring large and guaranteed bandwidth such as High Definition (HD) video, Virtual Reality (VR), and Augmented Reality (AR). URLLC is a requirement for critical applications such as automated driving and factory automation, which require guaranteed access within a very short time. MMTC needs to support massive number of connected devices such as smart metering and environment monitoring but can usually tolerate certain access delay. It will be appreciated that some of these applications may have relatively lenient Quality of Service/Quality of Experience (QoS/QoE) requirements, while some applications may have relatively stringent QoS/QoE requirements (e.g. high bandwidth and/or low latency).

5G may be implemented using spectrum allocated to 4G communications (e.g. Long Term Evolution (LTE) or LTE-Advanced) or unlicensed/unallocated spectrum (e.g. 5 GHz and 6 GHz unlicensed bands, all the way up to 60 GHz, also known as mmWave). This scenario is referred to as spectrum sharing and it allows network operators to roll out 5G access technology relatively quickly and cost efficiently. 5G use of unlicensed spectrum, whether in a stand-alone context or in combination with licensed or shared spectrum, is referred to as NR-U.

In order to ensure that disturbance/interference caused by 5G communications to other communications in the 4G or unlicensed spectrum is kept to a minimum, 5G employs a so-called Listen-Before-Talk (LBT) approach. LBT is a mechanism by which a communication device applies clear channel assessment (CCA) before using the shared/unlicensed spectrum (or channel). When LBT is applied, a transmitter listens to/senses the channel to determine whether the channel is free or busy and performs transmission only if the channel is sensed free. Effectively, a transmitter needs to determine ('listen') whether the channel in the shared/unlicensed spectrum is used by another transmitter (e.g. UE or base station) before it is allowed to transmit ('talk') using that channel. Specifically, CCA employs Energy Detection (ED) in order to determine whether the channel is clear or not.

NR Radio Access operating with shared spectrum channel access can operate in using a number of different modes in which primary cells (PCells), secondary cell (SCells), and/or a primary SCells (PSCells) can operate using shared spectrum and an SCell may be configured for downlink only. The gNB operates in either a dynamic or a semi-static channel access mode. In both channel access modes, the gNB and/or the UE may apply LBT before performing a transmission on a cell configured with shared spectrum channel access.

In addition to dynamic scheduling of resources, there are two schemes for semi-static scheduling of resources (referred to as 'configured grant (CG)') for uplink transmissions. In the first type of semi-static scheduling (referred to as referred to as configured grant type 1) all the transmission parameters (including periodicity, time offset, and frequency resources), and the modulation and coding scheme, are set by the base station using radio resource control (RRC) signalling. With the type 1 configuration, the UE can start to use the configured grant at a time set by the periodicity and offset. The offset parameter is used to effectively control the time at which the UE activates the configured grant. In the second type of semi-static scheduling (referred to as configured grant type 2) a periodicity is set by the base station using radio resource control (RRC) signalling whereas the resources are provided when the grant is to be activated by means of the physical downlink control channel (PDCCH). A time offset is not used in this case as the activation time is well defined by the timing of the PDCCH.

UEs and gNBs may be implemented as frame based equipment (FBE) in which the transmit/receive structure utilises a frame based approach to LBT access that utilises periodic timing with a periodicity equal to a so-called fixed frame period (FFP). UEs and gNBs may alternatively be implemented as load based equipment (LBE) in which the transmit/receive structure utilises a load based approach to LBT access in which access is not fixed in time with respect to an FFP, but is demand-driven (in a similar manner to Wi-Fi systems).

In the frame based approach, an initiating FBE (which may be a gNB or a UE) performs a CCA, immediately before entering the start of a new FFP, during a single observation slot (typically, for example, 9 us (microseconds)). An operating channel is considered occupied if the energy level in at least one operating channel exceeds an associated ED threshold level (TL). If this initiating device finds the operating channel(s) to be clear, it may begin to transmit immediately during the FFP. If the initiating device finds an operating channel to be occupied, then it will not transmit on that channel during the following FFP (although it may be allowed to continue short control signalling transmissions on this channel providing it complies with certain requirements). For equipment having simultaneous transmissions on multiple (adjacent or non-adjacent) operating channels, the equipment is allowed to continue transmissions on other operating channels providing the CCA check did not detect any signals on those channels.

The total time during which initiating FBE can perform transmissions on a given channel following a successful CCA, without re-evaluating the availability of that channel, is defined as the channel occupancy time (COT). During this COT, the initiating device can transmit and/or receive on the corresponding operating channel(s). The COT is followed by an idle period, until the start of the next FFP, during which the initiating device does not transmit communications to one or more responding devices. In certain cases, the responding device(s) will also not transmit to the initiating device during an idle period of an FFP for the initiating device. The maximum COT associated with a successful CCA for FBE operation is generally no greater than 95% of the FFP, and the idle period is generally at least 5% of channel occupancy time, or 100 microseconds (if greater).

The initiating equipment may perform multiple transmissions within a given COT without performing an additional CCA on the corresponding operating channel(s) as long as the gap between such transmissions does not exceed a maximum transmission gap (typically, for example, 16 us). If the gap exceeds the maximum transmission gap, then the initiating equipment may continue transmissions provided that an additional CCA indicates that there are no transmissions with an energy detection level above the associated ED TL. Any additional CCA is performed within the gap and within a single observation slot immediately before transmission. Any transmission gaps are treated as being part of the COT.

An initiating device may also receive transmissions during the COT from one or more associated responding devices (a responding devices may be a UE or gNB) by granting an authorisation to the responding device(s) to transmit on the corresponding operating channel within the COT.

Any responding device(s) receiving such a transmission grant from an associated initiating device may proceed with transmissions on the current operating channel, without performing a CCA, as long as the transmissions are initiated within the maximum transmission gap (typically, for example, 16 us) following the last transmission by the initiating device that issued the grant. Any responding device that does not proceed with such transmissions within the maximum transmission gap transmission following the last transmission from the initiating device that issued the grant will perform a CCA on the associated operating channel(s) during an observation slot within a set period (typically, for example, 25 us) ending immediately before a granted transmission time. If energy is detected above an associated ED TL then the transmission grant for the responding device is treated as having been withdrawn. If any energy detected is below the associated ED TL then the responding device may perform transmissions on the current operating channel for the remaining COT of the current FFP. The responding device may perform multiple transmissions on this operating channel provided that the gap between such transmissions does not exceed the maximum transmission gap. When the transmissions by the responding device are completed the then the transmission grant for the responding device is treated as having been withdrawn.

An initiating device can, upon correct reception of a packet which was intended for that device, skip CCA and immediately proceed with the transmission of management and control frames (e.g. acknowledgement (ACK) and/or block ACK frames). A consecutive sequence of such transmissions by the initiating device, without performing a new CCA, should, nevertheless, not exceed the maximum COT. For the purpose of multi-cast, respective ACK transmissions, associated with the same data packet, for each of a plurality of individual devices may take place in a sequence.

Where the initiating device is a gNB, the initiating gNB will therefore occupy the channel at the beginning of the fixed frame period after a one-shot LBT. Within each COT multiple transmissions are allowed in different directions, subject to a one-shot LBT. UEs served by the gNB can transmit within the COT, where the gNB is the initiating device and the served UEs are responding devices in FBE. The possibility of the UE being a COT initiator has also been agreed for semi-static channel access for the latest standards releases.

During a gNB's FFP any UE served by the gNB, whether operating as a COT responder or a COT initiator, should not transmit during the idle period of that gNB. The gNB, when operating as a COT initiator is, nevertheless, allowed to transmit during the idle period of a UE's FFP. However, the gNB, when operating as a COT responder, is not allowed to transmit during the idle period of a UE that initiated the COT. Moreover, the gNB, when operating as a COT responder, is still not allowed to transmit during the idle period of its own FFP.

For UEs (and in particular URLLC/IIoT UEs) operating using shared/unlicensed spectrum enhanced channel access mechanisms are in development that support UE initiated COT. These include, for the semi-static channel access mode, support using the transmission of any scheduled/configured UL channel/signal to initiate a COT by a UE in an RRC connected ('RRC CONNECTED') mode with the possibility of extension, in the future, to the case when the UE is in the IDLE/INACTIVE mode.

The channel access mechanisms support UE-to-gNB COT sharing in the semi-static channel access mode. Moreover, for the semi-static channel access mode, the start of FFP for UE-initiated COT can be different from the start of FFP for gNB-initiated COT. It is also possible that the FFP Periodicity for a UE-initiated COT can be different from the FFP periodicity for a gNB-initiated COT.

Each FFP is defined by respective FFP configuration parameters including an FFP offset parameter that defines when the corresponding FFP will start relative to a radio frame, and an FFP periodicity parameter defining the periodicity and/or duration of the corresponding FFP.

The possibility of different UEs having different FFP offsets, relative to the start of a radio frame, for UE-initiated COT has the potential to result in collisions between different UE's and the blocking of higher priority transmissions from one UE by lower priority transmissions from another UE.

For example, a first UE initiator having a first FFP offset may sense a clear channel and begin to send configured grant uplink transmissions in its FFP before a second UE having a second, longer, FFP offset has had an opportunity to start transmitting. Accordingly, even if the second UE has data to send in the uplink, using a configured grant, that is of a higher priority than that of the first UE it can, in effect, be blocked by the lower priority transmissions of the first UE because, when performing CCA, the second UE senses the transmissions of the first UE and does not start transmitting. This issue can result in prolonged blocking of the second UEs transmission because the UE may repeatedly initiate a COT in every FFP.

These issues are of particular relevance for URLLC devices where low latency and high reliability are of particular importance. Such URLLC devices typically use configured grants for communications in the uplink that have CG periodicities and/or offsets, that represent when the UE is allowed to transmit, and may have a retransmission timer (e.g. cg-RetransmissionTimer) configured that dictates when a UE should attempt retransmit data in the event that an acknowledgement has not been received.

For example, the fact that a gNB may not know in advance that a given UE may need to transmit URLLC data, and another (URLLC or non-URLLC) UE may sense during the idle period and initiate its own COT can potentially lead to undesirable delays and associated latency in transmission of the URLLC data.

In order to help harmonise UL CG enhancements for NR-U and URLLC, at least for FBE, it is currently considered that configuration of the CG retransmission timer should not be mandated when configured grant Type 1 or Type 2 are configured on unlicensed spectrum. This has the potential to result in additional complexities for URLLC devices. It is likely therefore that further developments will be needed to help further harmonise the CG features for URLLC and NR-U.

There is, therefore, a need for improvements in how LBT mechanisms are implemented, especially in the context of UE initiated COT. These improvements are needed, in particular, for supporting semi-statically configured URLLC devices but it will be appreciated that the improvements will have wider benefits beyond URLLC devices and may require improvement in the way either URLLC or non-URLLC devices operate.

SUMMARY OF INVENTION

Accordingly, the present invention seeks to provide improved methods and associated apparatus that at least partially addresses the above need.

Although for efficiency of understanding for those of skill in the art, the invention will be described in detail in the context of a 3GPP system (5G networks), the principles of the invention can be applied to other systems as well.

Example aspects of the invention are set out in the appended independent claims. Optional but beneficial features are set out in the appended dependent claims.

In one example aspect there is provided a method performed by a user equipment (UE) that communicates with a radio access network (RAN), the method including: maintaining information for configuring timing of fixed frame period (FFPs) for a listen-before-talk (LBT) procedure; when the UE has data to be transmitted, performing a clear channel assessment, CCA, to determine if a communication channel is clear; and when the CCA indicates that the communication channel is clear: initiating a channel occupancy time, COT, for the UE within a subsequent FFP; initiating transmission of the data to be transmitted within the COT; receiving an indication, from a node of the RAN, that the transmission should be stopped; and ceasing the transmission of the data in response to the received indication.

In one example aspect there is provided a method performed by a user equipment (UE) that communicates with a radio access network (RAN), the method including: maintaining information for configuring timing of fixed frame period (FFPs) and a plurality of energy detection (ED) thresholds, for a listen-before-talk (LBT) procedure, wherein each ED threshold of the plurality of thresholds is associated a different respective possible data characteristic that data transmitted by the UE may have; when the UE has data to be transmitted, performing a clear channel assessment, CCA, to determine if a communication channel is clear, wherein the CCA includes comparing a detected energy level with an ED threshold of the plurality of ED thresholds that is associated with a corresponding characteristic of the data to be transmitted; and when the CCA indicates that the communication channel is clear: initiating a channel occupancy time, COT, for the UE within a subsequent FFP; and initiating transmission of the data to be transmitted within the COT.

In one example aspect there is provided a method performed by a radio access network (RAN) that serves a plurality of user equipments (UEs), each UE being respectively configured with fixed frame period (FFPs) for a listen-before-talk (LBT) procedure the method including: receiving data transmitted by a first UE of the plurality of UEs during a first channel occupancy time, COT, initiated by the first UE within an FFP with which the first UE is configured; receiving a transmission by a second UE of the plurality of UEs during a second COT initiated by the second UE within an FFP with which the second UE is configured, wherein the transmission by the second UE is received during the first COT initiated by the first UE; determining, based on the transmission by the second UE, whether transmission by the first UE should be stopped; and when it is determined that transmission by the first UE should be stopped: transmitting, to the first UE, an indication that transmission by the first UE should be stopped.

In one example aspect there is provided a method performed by a radio access network (RAN) that serves at least one user equipment (UE), each UE being respectively configured with fixed frame period (FFPs) for a listen-before-talk (LBT) procedure the method including: providing configuration information to each UE for at least partially configuring timing of respective fixed frame period (FFPs) for a listen-before-talk (LBT) procedure in which each UE is respectively able to initiate a channel occupancy time (COT) of an FFP for that UE subject to a clear channel assessment (CCA); wherein the configuration information provided by the radio access network (RAN) is configured for configuring a respective timing for the FFPs of each UE that is based on a corresponding FFP of the node of the RAN.

The configuration information provided by the radio access network (RAN) may be configured for ensuring at least one of the following, based on the corresponding FFP of the node of the RAN: a respective timing for the FFPs of each UE in which none of the FFPs for a UE overlap with an end of the corresponding FFP of the node of the RAN by more than a time period corresponding to an idle period for the FFPs of that UE; a respective timing for the FFPs of each UE in which all of the FFPs for a UE occur within the corresponding FFP of the node of the RAN without extending beyond the end of the corresponding FFP of the node of the RAN by more than a time period corresponding to an idle period for the FFPs of the UE; a respective timing for the FFPs of each UE in which at least a COT part of the FFPs for each UE do not coincide with at least a COT part of the FFPs for another UE served by the node of the RAN; a respective duration for at least one of the FFPs of each UE that is equal to a duration of the corresponding FFP of the node of the RAN divided by an integer divisor; or a respective periodicity for the FFPs of each UE that is equal to a periodicity of the corresponding FFP of the node of the RAN divided by an integer divisor.

In one example aspect there is provided a method performed by a user equipment (UE) that communicates with a radio access network (RAN), the method including: receiving configuration information from a node of the RAN for at least partially configuring timing of fixed frame period (FFPs), for a listen-before-talk (LBT) procedure for the UE, wherein the UE is able to initiate a respective channel occupancy time (COT) in each FFP subject to a clear channel assessment (CCA); and determining the timing of the FFPs for the UE based on the received configuration information; wherein the UE determines a timing for the FFPs of the UE, based on the received configuration information, that is based on a corresponding FFP of the node of the RAN.

The UE may determine a timing for the FFPs of the UE, based on the received configuration information in which at least one of the following applies: none of the FFPs for the UE overlap with an end of the corresponding FFP of the node of the RAN by more than a time period corresponding to an idle period for the FFPs of the UE; all of the FFPs for the UE occur within the corresponding FFP of the node of the RAN without extending beyond the end of the corresponding FFP of the node of the RAN by more than a time period corresponding to an idle period for the FFPs of the UE; at least a COT part of the FFPs for the UE do not coincide with at least a COT part of the FFPs for another UE served by the node of the RAN; a respective duration for at least one of the FFPs of the UE is equal to a duration of a corresponding FFP of the node of the RAN divided by an integer divisor; or a respective periodicity for the FFPs of the UE is equal to a periodicity of the corresponding FFP of the node of the RAN divided by an integer divisor.

In one example aspect there is provided a user equipment (UE) for communicating with a radio access network (RAN), the UE including: a controller and a transceiver wherein the controller is configured: to maintain information for configuring timing of fixed frame period (FFPs) for a listen-before-talk (LBT) procedure; to, when the UE has data to be transmitted, perform a clear channel assessment, CCA, to determine if a communication channel is clear; and when the CCA indicates that the communication channel is clear: to initiate a channel occupancy time, COT, for the UE within a subsequent FFP; to control the transceiver to initiate transmission of the data to be transmitted within the COT; to control the transceiver to receive an indication, from a node of the RAN, that the transmission should be stopped; and to control the transceiver to cease the transmission of the data in response to the received indication.

In one example aspect there is provided a user equipment (UE) for communicating with a radio access network (RAN), the UE including: a controller and a transceiver wherein the controller is configured: to maintain information for configuring timing of fixed frame period (FFPs) and a plurality of energy detection (ED) thresholds, for a listen-before-talk (LBT) procedure, wherein each ED threshold of the plurality of thresholds is associated a different respective possible data characteristic that data transmitted by the UE may have; to, when the UE has data to be transmitted, perform a clear channel assessment, CCA, to determine if a communication channel is clear, wherein the CCA includes comparing a detected energy level with an ED threshold of the plurality of ED thresholds that is associated with a corresponding characteristic of the data to be transmitted; and when the CCA indicates that the communication channel is clear: to initiate a channel occupancy time, COT, for the UE within a subsequent FFP; and to control the transceiver to initiate transmission of the data to be transmitted within the COT.

In one example aspect there is provided a node of a radio access network (RAN) that serves a plurality of user equipments (UEs), each UE being respectively configured with fixed frame period (FFPs) for a listen-before-talk (LBT) procedure the node of the RAN including: a controller and a transceiver wherein the controller is configured: to control the transceiver to receive data transmitted by a first UE of the plurality of UEs during a first channel occupancy time, COT, initiated by the first UE within an FFP with which the first UE is configured; to control the transceiver to receive a transmission by a second UE of the plurality of UEs during a second COT initiated by the second UE within an FFP with which the second UE is configured, wherein the transmission by the second UE is received during the first COT initiated by the first UE; to determine, based on the transmission by the second UE, whether transmission by the first UE should be stopped; and when it is determined that transmission by the first UE should be stopped: to control the transceiver to transmit, to the first UE, an indication that transmission by the first UE should be stopped.

In one example aspect there is provided a node of a radio access network (RAN) that serves a plurality of user equipments (UEs), each UE being respectively configured with fixed frame period (FFPs) for a listen-before-talk (LBT) procedure the node of the RAN including: a controller and a transceiver wherein the controller is configured: to provide configuration information to each UE for at least partially configuring timing of respective fixed frame period (FFPs) for a listen-before-talk (LBT) procedure in which each UE is respectively able to initiate a channel occupancy time (COT) of an FFP for that UE subject to a clear channel assessment (CCA); wherein the configuration information provided by the radio access network (RAN) is configured for configuring a respective timing for the FFPs of each UE that is based on a corresponding FFP of the node of the RAN.

In one example aspect there is provided a user equipment (UE) for communicating with a radio access network (RAN), the UE including: a controller and a transceiver wherein the controller is configured: to control the transceiver to receive configuration information from a node of the RAN for at least partially configuring timing of fixed frame period (FFPs), for a listen-before-talk (LBT) procedure for the UE, wherein the UE is able to initiate a respective channel occupancy time (COT) in each FFP subject to a clear channel assessment (CCA); and to determine the timing of the FFPs for the UE based on the received configuration information; wherein the controller is configured to determine a timing for the FFPs of the UE, based on the received configuration information, that is based on a corresponding FFP of the node of the RAN.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

Overview

An exemplary telecommunication system will now be described, by way of example only, with reference to FIGS. 1 to 4.

Figure 1:
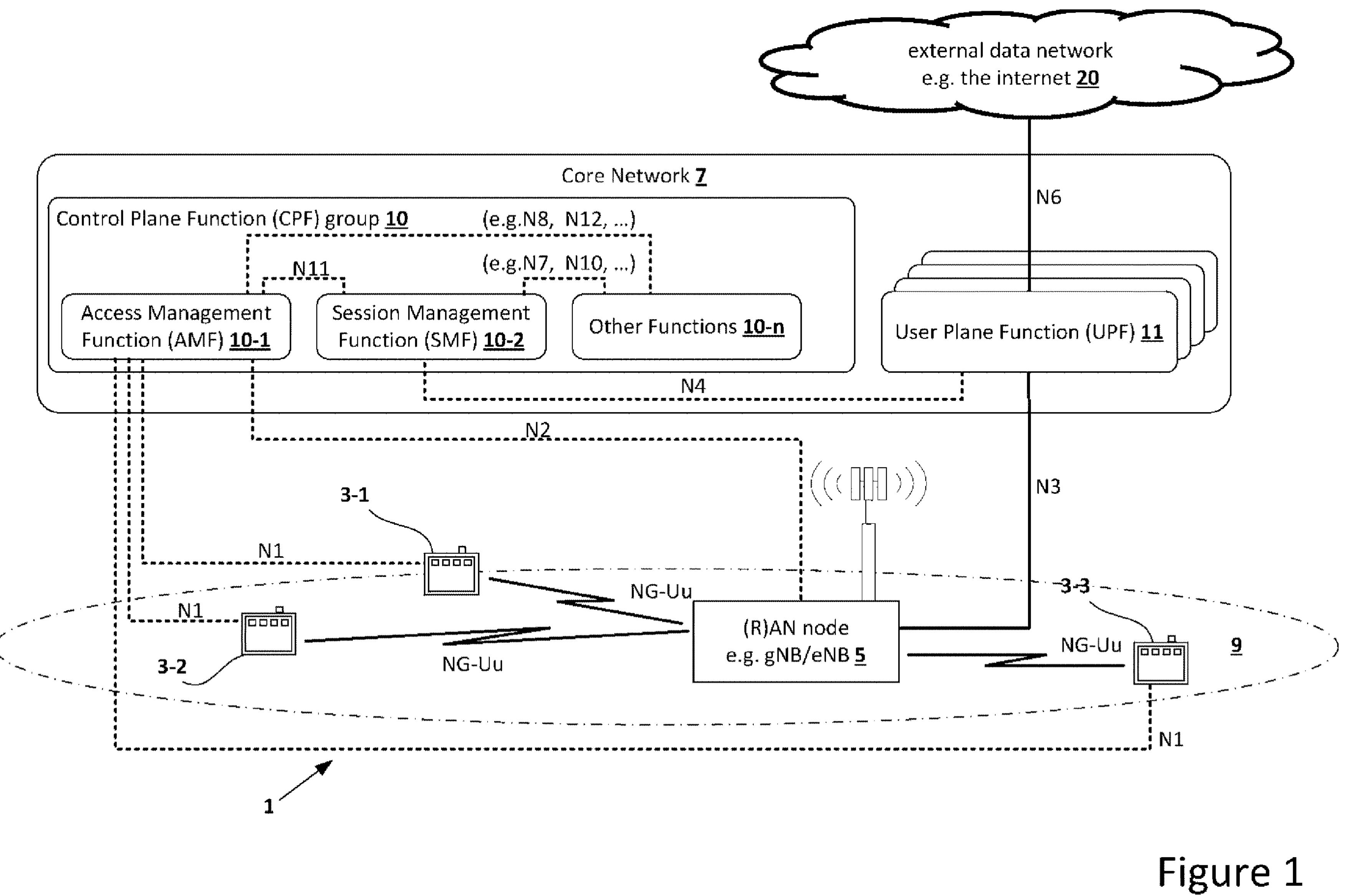
FIG. 1 illustrates schematically a mobile (cellular or wireless) telecommunication system to which example embodiments of the invention may be applied.

FIG. 1 schematically illustrates a mobile ('cellular' or 'wireless') telecommunication system 1 to which example embodiments of the present invention are applicable.

In the network 1 user equipment (UEs) 3-1, 3-2, 3-3 (e.g. mobile telephones and/or other mobile devices) can communicate with each other via base stations 5 can communicate with each other via a radio access network (RAN) node 5 that operates according to one or more compatible radio access technologies (RATs). In the illustrated example, the RAN node 5 includes a NR/5G base station or 'gNB' 5 operating one or more associated cells 9. Communication via the base station 5 is typically routed through a core network 7 (e.g. a 5G core network or evolved packet core network (EPC)).

As those skilled in the art will appreciate, whilst three UEs 3 and one base station 5 are shown in FIG. 1 for illustration purposes, the system, when implemented, will typically include other base stations and UEs.

Each base station 5 controls the associated cell(s) either directly, or indirectly via one or more other nodes (such as home base stations, relays, remote radio heads, distributed units, and/or the like). It will be appreciated that the base stations 5 may be configured to support both 4G and 5G, and/or any other 3GPP or non-3GPP communication protocols.

The UEs 3 and their serving base station 5 are connected via an appropriate air interface (for example the so-called 'Uu' interface and/or the like). Neighbouring base stations 5 may be connected to each other via an appropriate base station to base station interface (such as the so-called 'X2' interface, 'Xn' interface and/or the like).

The core network 7 includes a number of logical nodes (or 'functions') for supporting communication in the telecommunication system 1. In this example, the core network 7 includes control plane functions (CPFs) 10 and one or more user plane functions (UPFs) 11. The CPFs 10 include one or more Access and Mobility Management Functions (AMFs) 10-1, one or more Session Management Functions (SMFs) and a number of other functions 10-n.

The base station 5 is connected to the core network nodes via appropriate interfaces (or 'reference points') such as an N2 reference point between the base station 5 and the AMF 10-1 for the communication of control signalling, and an N3 reference point between the base station 5 and each UPF 11 for the communication of user data. The UEs 3 are each connected to the AMF 10-1 via a logical non-access stratum (NAS) connection over an N1 reference point (analogous to the S1 reference point in LTE). It will be appreciated, that N1 communications are routed transparently via the base station 5.

The UPF(s) 11 are connected to an external data network (e.g. an IP network such as the internet) via reference point N6 for communication of the user data.

The AMF 10-1 performs mobility management related functions, maintains the non-NAS signalling connection with each UE 3 and manages UE registration. The AMF 10-1 is also responsible for managing paging. The SMF 10-2 provides session management functionality (that formed part of MME functionality in LTE) and additionally combines some control plane functions (provided by the serving gateway and packet data network gateway in LTE). The SMF 10-2 also allocates IP addresses to each UE 3.

In this example, at least some of the UEs 3-1 are configured as URLLC UEs although it will be appreciated that each UE 3 may support one or more services which may fall into any of the categories defined above (URLLC/eMBB/mMTC). Each service will typically have associated requirements (e.g. latency/data rate/packet loss requirements, etc.), which may be different for different services.

Each UE 3 is respectively configured to operate as frame based equipment (FBE) and to implement listen-before-talk (LBT) procedures in which each UE 3 is configured with a respective fixed frame period (FFP) and can operate as a channel occupancy time (COT) initiator or as a COT responder. When operating as a COT initiator, the UE performs the usual procedures for accessing unlicensed or shared spectrum including clear channel assessment (CCA) based on a comparison of a detected energy level with an energy detection (ED) threshold level (TL), immediately before entering the start of a new FFP, during a single observation slot. When a COT initiating UE finds the operating channel(s) to be clear, it may begin to transmit immediately during the FFP. If the initiating UE finds an operating channel to be occupied, then it will not transmit on that channel during the following FFP (although it may be allowed to continue short control signalling transmissions on this channel providing it complies with certain requirements).

Similarly, the gNB 5 is configured to operate as FBE and to implement LBT procedures in which the gNB 5 is configured with a gNB FFP and can operate as a COT initiator or as a COT responder. When operating as a COT initiator, the gNB 5 performs the usual procedures for accessing unlicensed or shared spectrum including CCA based on a comparison of a detected energy level with an ED TL, immediately before entering the start of a new FFP, during a single observation slot.

Each FFP is defined by respective FFP configuration parameters including an FFP offset parameter that defines when the corresponding FFP will start, and an FFP periodicity defining the periodicity and/or duration of the corresponding FFP. It will be appreciated that the respective proportions of the FFP that may form a COT (when initiated) and associated idle time may be defined by other parameters that may be preconfigured at the UE 3 or gNB 5, or may be dynamically or semi-statically configured by the gNB 5.

In this example each UE FFP may be configured with a different FFP offset than that of the FFP for a gNB 5. Similarly, in this example each UE FFP may be configured with a different FFP periodicity than that of the FFP for a gNB 5.

The FFP offset parameter for configuring the start of the respective FFP for the UE-initiated COT of each UE, relative to a radio frame, is provided to the UE 3 by dedicated RRC signalling from the gNB 5 although it will be understood that the FFP offset parameter could alternatively, or additionally, be provided using a system information block (SIB) for example by a type 1 SIB (SIB1). The UE FFP periodicity may also be configured explicitly using RRC signalling and/or a SIB (e.g. SIB1) or may be determined implicitly at the UE 3 based on other higher layer parameters. It will be appreciated, for example, that UE FFP periodicity and/or duration may be determined implicitly based on other configurations such as random access channel (RACH) configuration parameters, uplink configured grant (CG) configuration parameters or the like.

Figure 2:
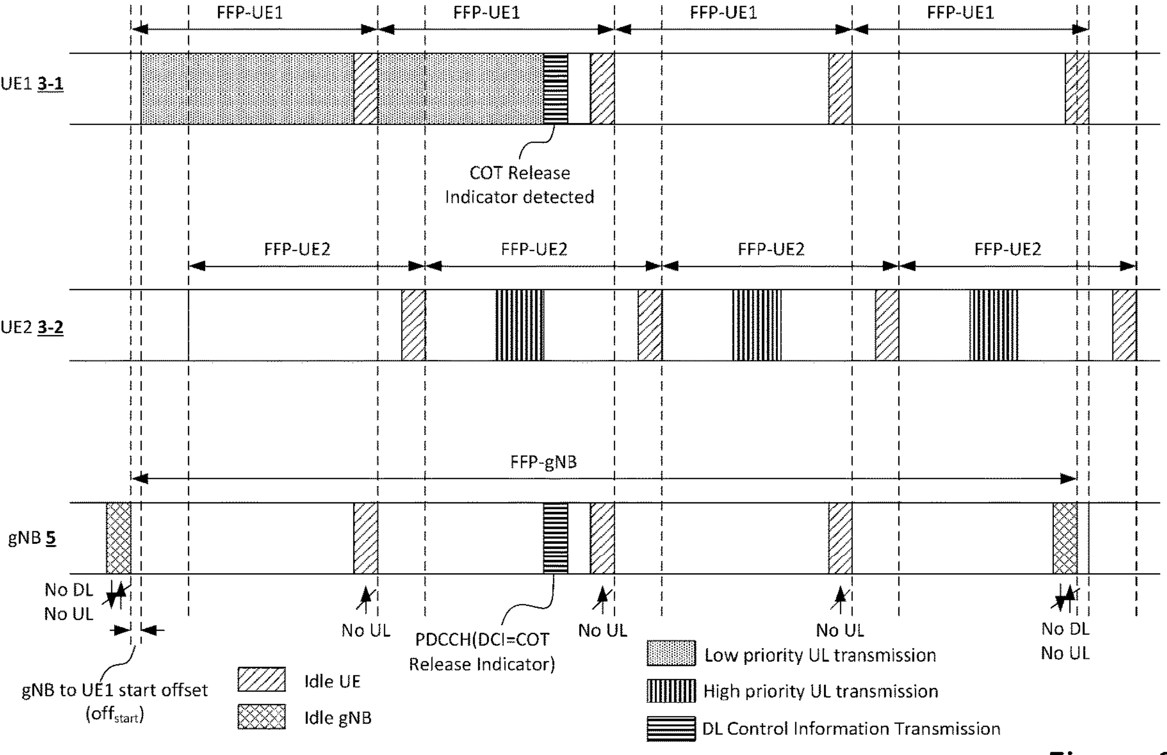
FIG. 2 illustrates, schematically, a number of improved LBT related features that may be implemented in the system of FIG. 1.
Figure 3:
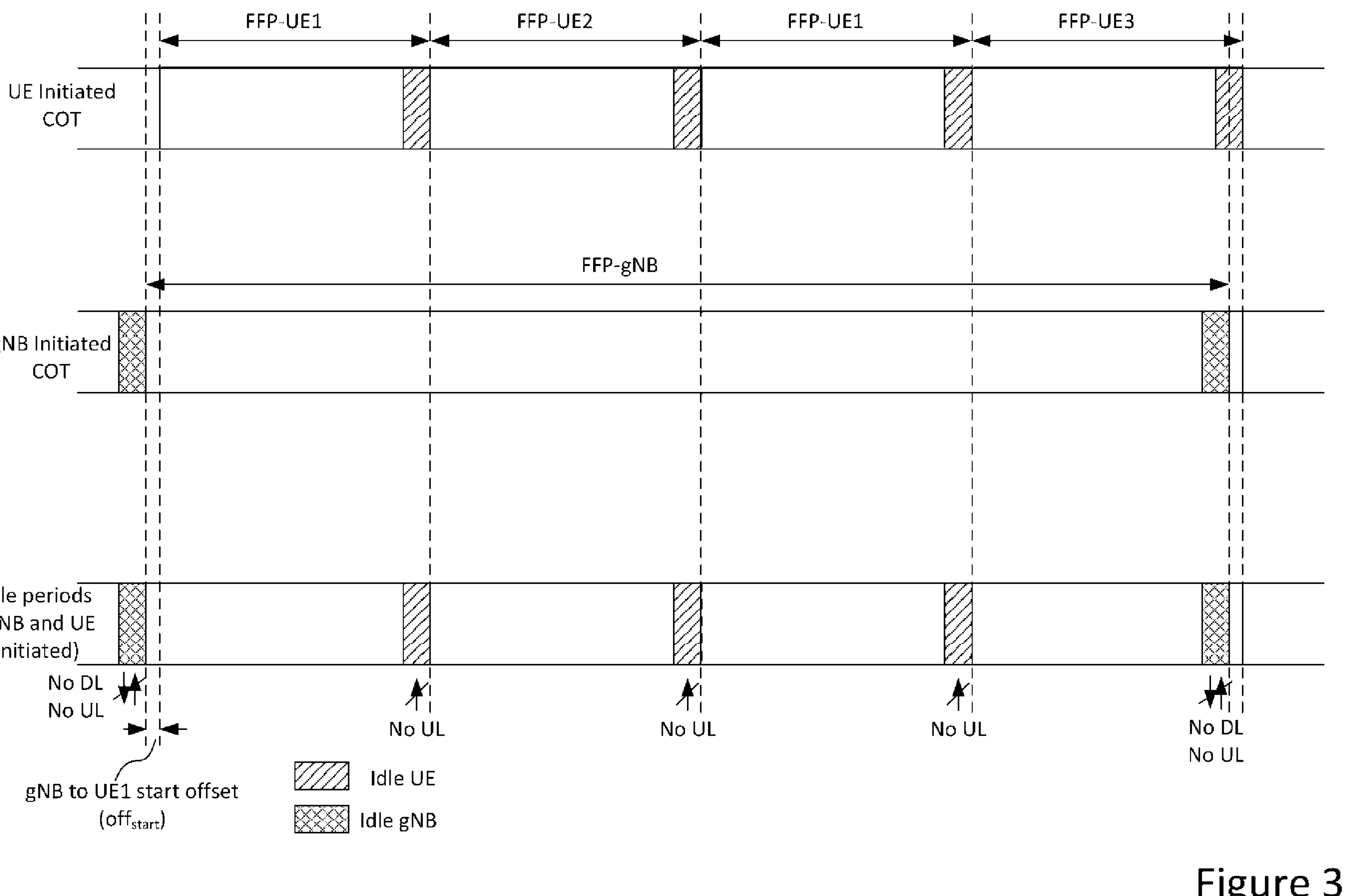
FIG. 3 illustrates, schematically, a number of other improved LBT related features that may be implemented in the system of FIG. 1.

Referring to FIGS. 2 and 3 in particular, the gNB 5 and UE 3 are beneficially configured with a number of optional features for alleviating or avoiding collisions between different UEs using the shared/unlicensed spectrum, for inhibiting one UE from blocking another, and/or for making collision handling simpler.

FIG. 2 illustrates, schematically, a number of improved LBT related features that may be implemented in the system of FIG. 1.

As seen in FIG. 2, the gNB 5 of this example is configured to be able to cancel the uplink transmissions of a transmitting UE 3-1 when another UE 3-2 has higher priority uplink data to transmit (e.g. a higher priority URLLC transmission). In this example, this is achieved by sending an indication that transmission should be stopped (e.g. in the form of a COT 'cancellation' or 'release' indication), to the transmitting UE, using appropriate signalling during a downlink period of that UE's FFP. The release indication is, in this example, provided in the form of an appropriately formatted downlink control information (DCI) field of a physical downlink control channel (PDCCH) or the like. The release indication triggers the UE 3-1 to release the corresponding UE initiated COT and in so doing supports a higher priority transmission from the other UE 3-2.

In this example, once a transmission or service of the UE 3-1 is cancelled, and the corresponding COT released, by means of the downlink release indication, the UE 3-1 for which transmission has been cancelled does not attempt initiate another COT, for the same transmission or service, until the gNB 5 has rescheduled the UL transmission for that UE 3-1.

The COT release indication may be provided in any suitable manner. The COT release indication may, for example, be in the form of a single bit of a DCI set to '1' (or '0') to indicate that the UE should release an ongoing UE initiated COT or a shared COT that the UE shares with the gNB 5. The single bit indication may include a newly added bit of a DCI format or may re-use an existing bit of a DCI format. The COT release indication may, alternatively, include a DCI field containing a CG configuration index of a configured grant for the UE transmission that is to be cancelled. The COT release indication may include a DCI field containing a bitmap indication to deactivate one or more indicated configured grants, for example, with each bit corresponding to a respective configured grant where the bit is set to '1' to indicate the corresponding grant is to be cancelled and '0' to indicate the corresponding grant is not to be cancelled (or vice versa). It will be appreciated that these options need not be mutually exclusive, and that the gNB may be capable of using (and the UE capable of interpreting) different DCI configurations in different circumstances.

Beneficially, each UE 3 is configurable with different ED threshold levels for different transmission priorities. Hence, a UE 3 (such as UE2 3-2 in FIG. 2) with high priority (e.g. URLLC) data to transmit is able to perform CCA in its observation slot using a higher ED threshold to determine if a corresponding uplink channel is occupied than if it only has low priority data to transmit. Thus, the UE 3-2 with high priority data to transmit may initiate a COT at the start of its next FFP, and begin to transmit the high priority data, even if the channel would otherwise be considered occupied based on a lower ED threshold level for lower priority (e.g.

URLLC) data being transmitted by another UE 3 (such as UE1 3-1 in FIG. 2). Thus, the UE 3-2 with a higher priority transmission will not be blocked from initiating its COT simply by a channel that is occupied by the lower priority transmission from the other UE 3-1.

The gNB 5 is configured to detect the high priority UL transmission from the corresponding UE 3-2, based on the FFP for that UE 3-2. Since the gNB 5 configures the UE's transmission occasions via UL configured grant, the gNB 5 can identify the high priority UE from the transmission timing. Moreover, the gNB 5 may also blind decode the UE's transmission to (ideally) pass a cyclic redundancy check (CRC) to confirm the priority level. In a variation on this, the high priority UE may send a scheduling request first, instead of actual transmission and the gNB 5 may identify that it has high priority data to transmit based on that scheduling request.

Hence, when the other UE 3-1 is already transmitting lower priority data to the gNB 5 using the same channel, as shown in FIG. 2, the gNB 5 can determine that this lower priority transmission should be cancelled and send the COT release indication to the UE 3-1 that is transmitting the lower priority data. The lower priority transmission is then cancelled, and the higher priority transmission(s) can continue, if needed, in one or more subsequent FFPs without interference from an ongoing lower priority transmission from the other UE 3-1.

The different ED threshold levels for different priority data may be preconfigured and associated with different L1 (physical (PHY) layer) priorities that may be assigned to a specific physical uplink shared channel when the resources for that channel are configured. For example, for UEs which may need to transmit high priority data (e.g. UEs which support URLLC) at least two levels of energy detection thresholds (e.g. a high threshold 'EDThreshHigh' and a low threshold 'EDThreshLow) may be configurable based on the L1 priority as follows:

EDThresHigh corresponding to a configured grant uplink channel with a PHY L1 Priority Indicator set to high (e.g. '1'); and EDThresLow corresponding to a configured grant uplink channel with a PHY L1 Priority Indicator set to low (e.g. '0')

It will be appreciated that whilst traffic having only two priority levels is envisaged in this example, where traffic may have more than two priority levels then a different respective ED threshold level could be assigned for each priority level.

Beneficially the gNB 5, in this example, is also configured to set the FFP offset of each UE 3 that it serves, relative to the start of a radio frame, to be longer than that of the gNB 5 thereby ensuring that the start position of gNB's COT is slightly before that of the UE's start position (as indicated by the value $off_{start}$ in FIG. 2). This effectively gives the gNB the priority to obtain the channel if needed. The minimum gap between the start time of the gNB FFP and that of the UE can be relatively small—sufficient for the gNB to transmit for a few symbols and the UE to sense in its observation slot (e.g. 9 us). This helps to avoid the possibility, arising if the FFP start position of the gNB and a given UE are aligned, that the gNB may not be able to stop the transmission of the UE.

FIG. 3 illustrates, schematically, a number of other improved LBT related features that may be implemented in the system of FIG. 1.

In the example illustrated in FIG. 3, the FFPs for the UEs 3 are, deliberately, configured to avoid a UE initiated COT being divided by an idle period of a corresponding gNB FFP. As explained in the introduction, a UE 3 is not allowed to transmit during an idle period of the gNB 5, and this configuration beneficially avoids the complexity that could otherwise arise in order to avoid transmission during an idle period of the gNB 5, within a UE initiated COT, during which a UE would otherwise be allowed to transmit.

In the example in FIG. 3, the UE FFP for UE initiated COT is effectively configured to avoid a UE FFP extending (significantly) beyond the end of a corresponding gNB FFP. Specifically, in the example of FIG. 3 the FFP for UE3 is configured to ensure that it does not extend beyond the end of the gNB FFP by more than a small amount equivalent to any offset ($off_{start}$) between the start of the gNB FFP and the first UE FFP (if such a start offset is implemented).

It will be appreciated that, in a variation of this feature, the UE FFP for UE initiated COT may be configured to avoid the UE FFP from extending beyond the end of a corresponding gNB FFP by more than the length of the idle period of the UE. It can be seen that, in this variation, the UE FFP for UE initiated COT is effectively configured to avoid the COT part of the UE FFP from extending beyond the end of a corresponding gNB FFP while allowing the idle part of the UE FFP to extend beyond the end of the gNB FFP. Whilst this would effectively reduce the final COT, and extend the period in which the UE is not allowed to transmit at the end of the UE FFP corresponding to the end of the gNB FFP, this still avoids a UE initiated COT from being punctured by the idle period of the gNB FFP.

In the example illustrated in FIG. 3, the FFPs of the UEs 3 are also deliberately configured to avoid the need for complex COT collision handling and to provide benefits in terms of improved reliability.

Specifically, as seen in FIG. 3, the gNB 5 is configured to ensure that the configuration of a UE's FFP, especially for a URLLC UE, so that the COT part of the UE FFP (at least) does not overlap with a COT part of another UE's FFP. Configuring the UE FFPs in this way ensures that collisions between at least the COT part of FFPs for different UEs are avoided.

It will be appreciated that, in the example of FIG. 2, the FFPs for a given UE are consecutive and so FFP offset and FFP periodicity (which is equivalent to FFP duration where the FFPs are consecutive) are sufficient to define when the UE's FFP starts and ends. In FIG. 3, however, the FFPs for different UEs are specifically configured to avoid overlaps at least of the UE COTs. Accordingly, in the example of FIG. 3, the periodicity and duration of the respective UE FFP for each UE are configured separately.

Moreover, in the example illustrated in FIG. 3, the FFP(s) for each UE (or at least each URLLC UEs' FFP) is respectively configured so that all FFPs are essentially within the FFP of the gNB 5 that serves that UE (save for the small amount, equivalent to the start offset ($off_{start}$), that the FFP for UE 3 extends beyond the end of the gNB FFP). That is all the FFPs for UEs and serving gNB are mutually configured to ensure that the FFP of the gNB overlaps substantially fully the FFP(s) for each UE (or at least each URLLC UEs' FFP). It will be appreciated that, whilst in the illustrated example, the FFP for UE 3 extends slightly beyond the end of the gNB FFP, the FFP(s) for each UE (or at least each URLLC UEs' FFP) may be respectively configured to ensure that the UE FFP is completely within the FFP of the gNB 5 that serves that UE.

Beneficially, in the example illustrated in FIG. 3, the respective periodicities of the gNB FFP and the UE FFPs are mutually configured to ensure that the periodicity ($P_{gNB}$) of the gNB FFP is an integer multiple, Np, of the periodicity ($P_{UE}$) of the UE FFP, such that:

$$P_{UE}=P_{gNB}/Np\_UE$$

Where Np_UE is the value of Np for a given UE.

The duration of the gNB FFP and the duration of UE FFP are also configured to be an integer multiple of some minimum period, T (e.g. where T=1 ms (or some minimum period defined in slots or symbols). Accordingly, the duration of the UE FFP ($FFP_{UE}$) relative to the gNB FFP ($FFP_{gNB}$) is given by:

$$FFP_{UE}=FFP_{gNB}/N$$

Where $FFP_{UE}$=M_ue*T, $FFP_{gNB}$=N*M_ue*T, and M_ue is an integer that is greater than or equal to 1.

The UE FFP periodicity and/or the UE FFP duration may be configured explicitly using dedicated RRC signalling (for example of the integer multiples N and/or Np) and/or a SIB (e.g. SIB1) or may be determined implicitly at the UE 3 based on other higher layer parameters.

Figure 4:
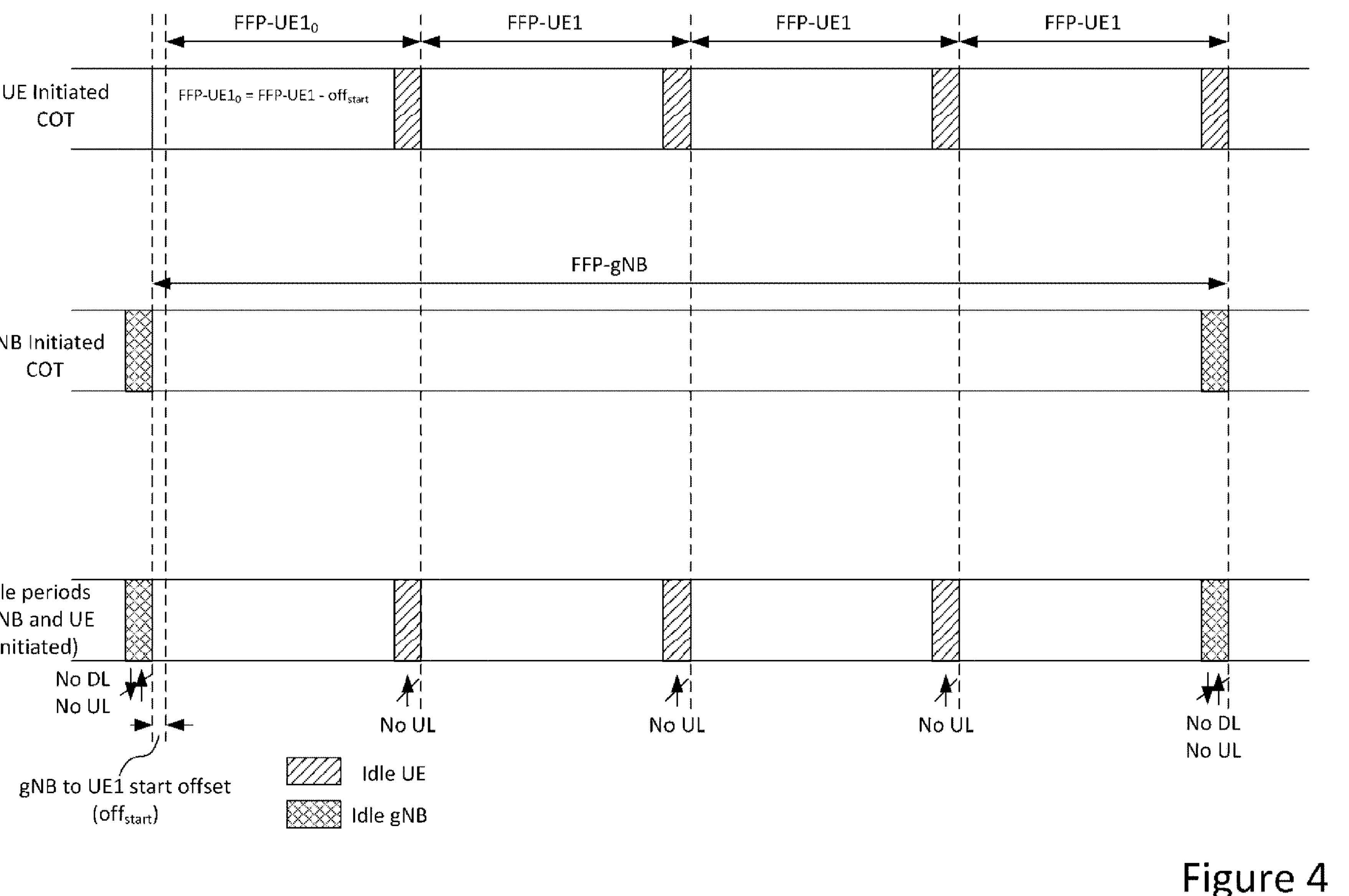
FIG. 4 illustrates, schematically, variations to some of the improved LBT related features that may be implemented in the system of FIG. 1.

FIG. 4 illustrates, schematically, variations to some of the improved LBT related features that may be implemented in the system of FIG. 1.

In the example of FIG. 4, the majority of the UE FFPs have a duration given by UE_FFP=gNB_FFP/N (as in FIG. 3). However, one UE FFP (in this example the first FFP) is beneficially configured to be shorter than the other UE FFPs by a value equivalent to the start offset ($off_{start}$):

$$FFP_{UE0}=(FFP_{gNB}/N)-Off_{start}$$

This beneficially ensures that the final UE FFP does not extend beyond the end of the gNB FFP, even by the small amount corresponding to the start offset, as seen in FIG. 4. It will be appreciated that while the periodicity for the first UE FFP is shortened in the illustrated example, the duration of any UE FFP may be shortened (e.g. the last UE FFP).

In another variation, the start offset, duration of the gNB FFP and the duration of UE FFP are all set to be equal to (or an integer multiple of) the minimum period, T (e.g. where T=0.5 ms (or some minimum period defined in slots or symbols).

It will be appreciated that whilst, in FIG. 4 only the FFPs for a single UE 3 are shown multiple UE FFPs may be configured, for example as shown in FIG. 3.

User Equipment (UE)

Figure 5:
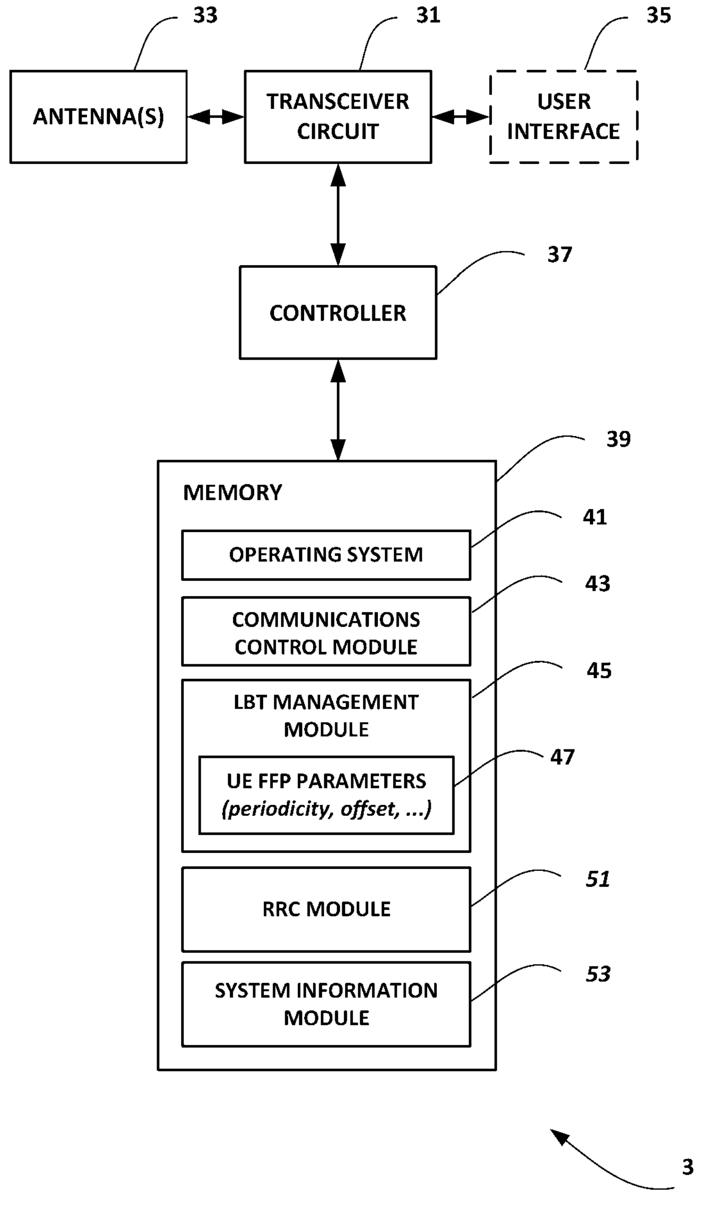
FIG. 5 is a schematic block diagram of a mobile device forming part of the system shown in FIG. 1.

FIG. 5 is a schematic block diagram illustrating the main components of a UE 3 as shown in FIG. 1, and in particular a URLLC/IIoT UE 3. It will be appreciated that while the UE 3 is described as being a URLLC/IIoT UE, the UE 3 may be configured for operating as another, non-URLLC/non-IIoT, UE 3.

As shown, the UE 3 has a transceiver circuit 31 that is operable to transmit signals to and to receive signals from a base station 5 via one or more antenna 33. The UE 3 has a controller 37 to control the operation of the UE 3. The controller 37 is associated with a memory 39 and is coupled to the transceiver circuit 31. Although not necessarily required for its operation, the UE 3 might, of course, have all the usual functionality of a conventional UE 3 (e.g. a user interface 35, such as a touch screen/keypad/microphone/speaker and/or the like for, allowing direct control by and interaction with a user) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the UE 3 by, in this example, program instructions or software instructions stored within memory 39. As shown, these software instructions include, among other things, an operating system 41, a communications control module 43, an LBT management module 45, a power saving management module 47, an RRC module 51, and a system information module 53.

The communications control module 43 is operable to control the communication between the UE 3 and its serving base station(s) 5 (and other communication devices connected to the base station 5, such as further UEs and/or core network nodes). The communications control module 43 is configured for the overall handling uplink communications via associated uplink channels (e.g. uplink control information via a physical uplink control channel (PUCCH) and/or other uplink data via a physical uplink shared channel (PUSCH)) and for handling receipt of downlink communications via associated downlink channels (e.g. downlink control information via a physical downlink control channel (PDCCH) and/or other downlink data via a physical downlink shared channel (PDSCH)). The communications control module 43 is responsible for identifying the resources to be used by the UE 3 for uplink communications (e.g. dynamically scheduled resources, or semi-statically configured resources for configured grants). The communications control module 43 is responsible for activating configured grants at an appropriate timing based either on the RRC signalling that provides the configured grant (in the case of type 1) or on L1/L2 signalling (in the case of type 2).

The LBT management module 45 is responsible for managing the performance of listen-before-talk communications using shared/unlicensed spectrum and related tasks. These LBT related tasks will typically include, for example, CCA in observation slots based on an appropriate ED threshold level (which may be a priority-based threshold where the UE is configured with such thresholds). The LBT related tasks will also typically include initiating a COT for the UE when operating as a COT initiator, receiving and responding to transmission grants from an initiating gNB when operating as a COT responder, and/or configuring the UE's FFP in accordance with appropriate configuration parameters 47 (such as an FFP offset and periodicity (and/or duration) indicated explicitly or implicitly by the gNB 5 and maintained at the UE. Where the UE 3 implements a COT cancellation mechanism such as that described in the overview, then the LBT related tasks include receiving COT release indications from the gNB and responding to them appropriately by, for example, ceasing uplink transmissions and releasing an ongoing COT before it would otherwise do so according to the FFP configuration associated with that COT.

The RRC module 51 is responsible for the reception of RRC signalling from the base station 5, and the transmission of RRC signalling to the base station 5. The RRC signalling may, for example, be used to obtain one or more of the configuration parameters used for configuring the UE's FFP such as an offset parameter that defines when the UE's FFP commences the FFP and a periodicity parameter that defines the periodicity of the UE's FFP (and potentially the duration if the FFPs are consecutive) and/or a duration parameter (if necessary) that defines the duration of each FFP.

The system information module 53 is responsible for the reception of system information from the base station 5. The system information received may, for example, include a system information block (e.g. SIB1) that includes one or more of the configuration parameters used for configuring the UE's FFP such as an offset parameter that defines when the UE's FFP commences the FFP and a periodicity parameter that defines the periodicity of the UE's FFP (and potentially the duration if the FFPs are consecutive) and/or a duration parameter (if necessary) that defines the duration of each FFP.

Access Network Node (Base Station)

Figure 6:
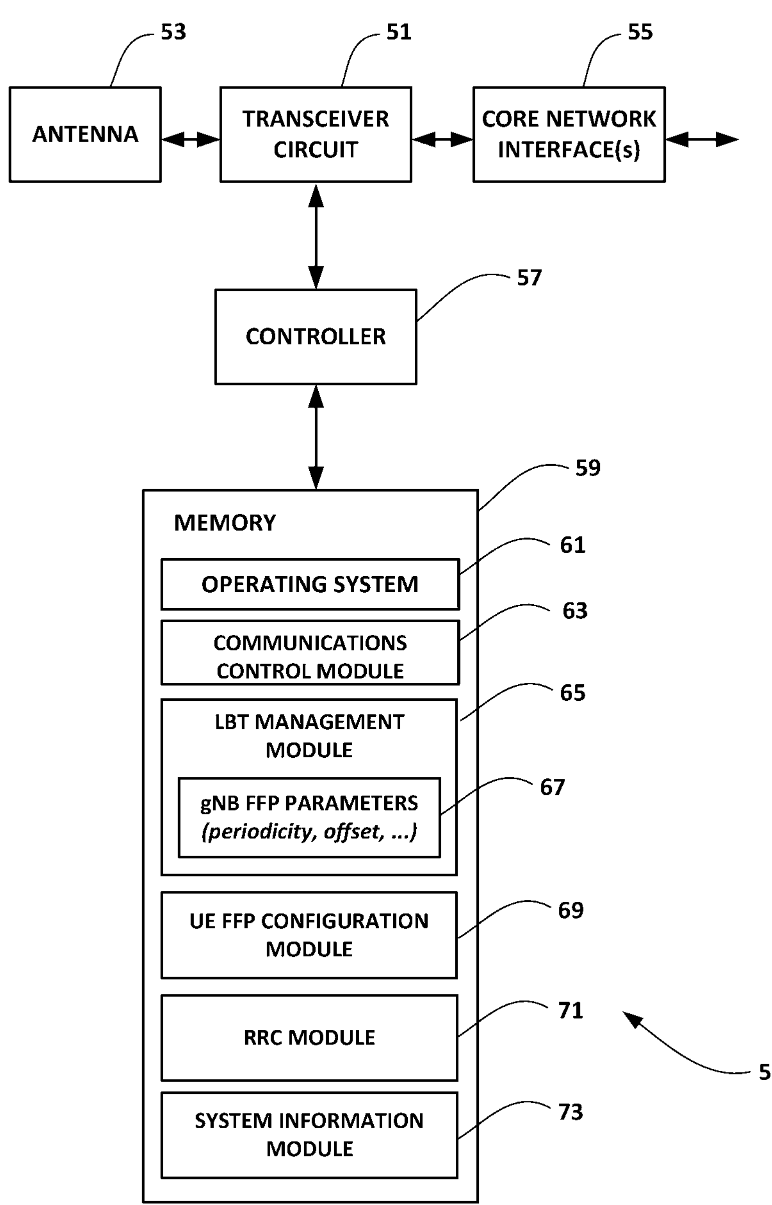
FIG. 6 is a schematic block diagram of an access network node (e.g. base station) forming part of the system shown in FIG. 1.

FIG. 6 is a schematic block diagram illustrating the main components of the base station 5 for the telecommunication system 1 shown in FIG. 1. As shown, the base station 5 has a transceiver circuit 51 for transmitting signals to and for receiving signals from the communication devices (such as UEs 3) via one or more antenna 53 (e.g. an antenna array/massive antenna), and a core network interface 55 (e.g. including the N2, N3 and other reference points/interfaces) for transmitting signals to and for receiving signals from network nodes in the core network 7. Although not shown, the base station 5 may also be coupled to other base stations via an appropriate interface (e.g. the so-called 'Xn' interface in NR). The base station 5 has a controller 57 to control the operation of the base station 5. The controller 57 is associated with a memory 59. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within memory 59.

As shown, these software instructions include, among other things, an operating system 61, a communications control module 63, an LBT management module 65, a UE FFP configuration module 69, an RRC module 71, and a system information module 73.

The communications control module 63 is operable to control the communication between the base station 5 and UEs 3 and other network entities that are connected to the base station 5. The communications control module 63 is configured for the overall control of the reception of uplink communications, via associated uplink channels (e.g. uplink control information via a physical uplink control channel (PUCCH) and/or other uplink data via a physical uplink shared channel (PUSCH)) and for handling the transmission of downlink communications via associated downlink channels (e.g. downlink control information via a physical downlink control channel (PDCCH) and/or other downlink data via a physical downlink shared channel (PDSCH)). The communications control module 63 is responsible for determining the resources that will be used by the UE 3 for uplink communications (e.g. dynamically scheduled resources, or semi-statically configured resources for configured grants). The communications control module 63 is also responsible for signalling the configured resources to the UE using RRC signalling and for indicating the timing at which the grant should be activated either using the RRC signalling that provides the configured grant (in the case of type 1) or using L1/L2 signalling (in the case of type 2).

The LBT management module 65 is responsible for managing the performance of listen-before-talk communications using shared/unlicensed spectrum and related tasks. These LBT related tasks will typically include, for example, CCA in observation slots based on an appropriate ED threshold level for the gNB 5. The LBT related tasks will also typically include initiating a COT for the gNB 5 when operating as a COT initiator, receiving and responding to transmission grants from an initiating UE when operating as a COT responder, and/or configuring the gNB's FFP in accordance with appropriate configuration parameters 67 (such as an FFP offset and periodicity and/or duration) maintained at the gNB 5. Where the gNB 5 implements a COT cancellation mechanism such as that described in the overview, then the LBT related tasks include determining when a particular UE 3 needs to release a COT and transmitting COT release indications to that UE 3.

The UE FFP configuration module 69 is responsible for determining the appropriate FFP parameters (such as an FFP offset and periodicity and/or duration) for the UEs 3 that the gNB 5 serves and for transmitting respective signalling to each UE 3 for configuring the corresponding respective FFP.

The RRC module 71 is responsible for the reception of RRC signalling from UE 3, and the transmission of RRC signalling to the UE 3. The RRC signalling may, for example, be used to provide one or more of the configuration parameters used for configuring the UE's FFP such as an offset parameter that defines when the UE's FFP commences the FFP and, potentially, a periodicity parameter that defines the periodicity of the UE's FFP (and potentially the duration if the FFPs are consecutive) and/or a duration parameter (if necessary) that defines the duration of each FFP.

The system information module 73 is responsible for the transmission of system information to UEs in the base station's cell(s) 9. The system information transmitted may, for example, include a system information block (e.g. SIB1) that includes one or more of the configuration parameters used for configuring the UE's FFP such as an offset parameter that defines when the UE's FFP commences the FFP and, potentially, a periodicity parameter that defines the periodicity of the UE's FFP (and potentially the duration if the FFPs are consecutive) and/or a duration parameter (if necessary) that defines the duration of each FFP.

UE COT Release

A possible mechanism for cancelling the uplink transmissions of one UE 3-1 when another UE 3-2 has higher priority uplink data to transmit, as introduced with reference to FIG. 2, will now be described, by way of example only, with reference to FIG. 7 which is a simplified timing diagram illustrating a UE COT release procedure.

Figure 7:
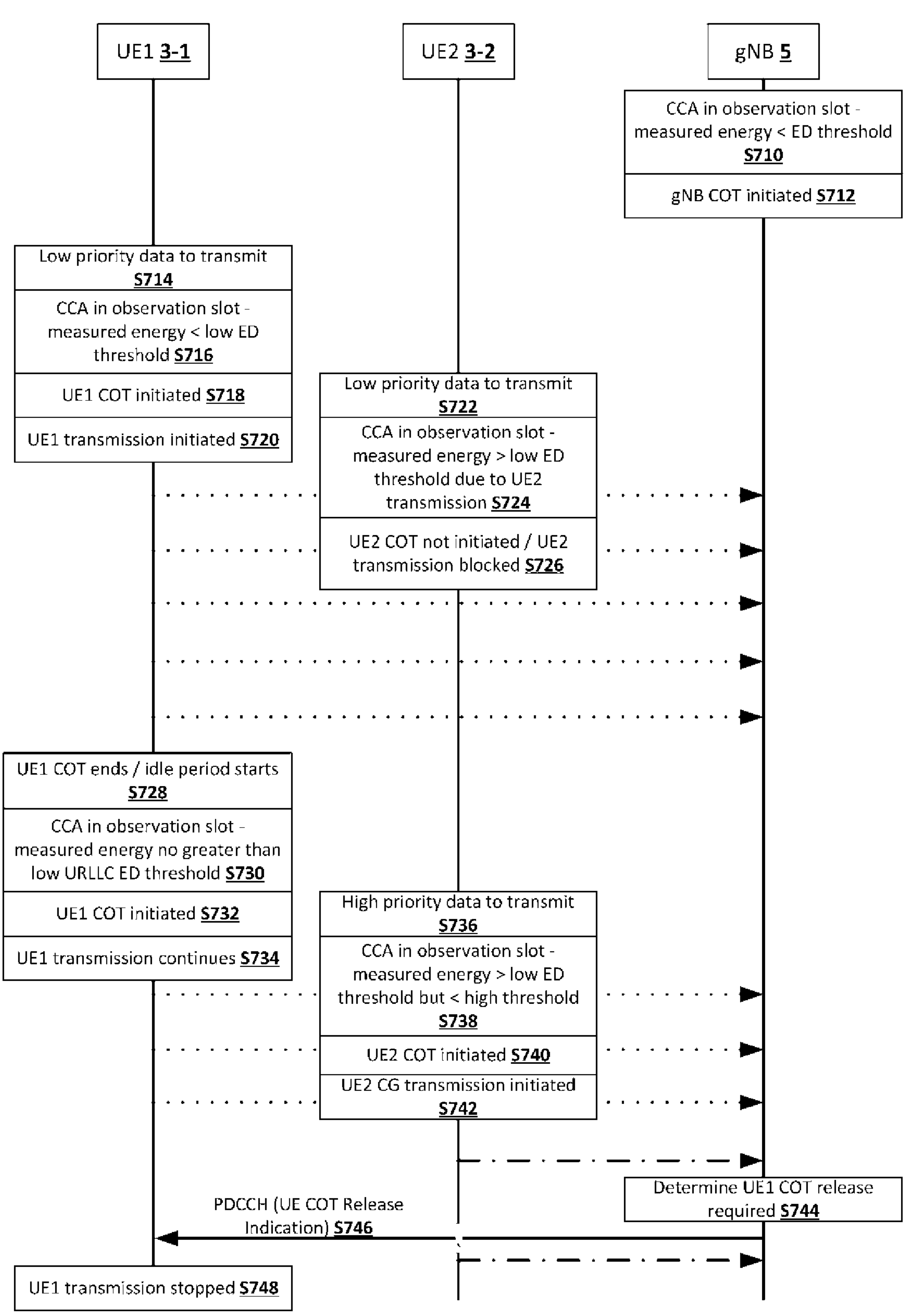
FIG. 7 is a simplified timing diagram illustrating a UE COT release procedure for the system shown in FIG. 1.

As seen in FIG. 7, the at S710, the gNB 5 performs CCA in an observation slot and determines that the detected energy is less than an ED threshold configured at the gNB 5. The gNB 5 thus initiates a COT of a gNB FFP at S712 and may proceed to transmit in the downlink to one or more UEs 3.

At S714 a UE (UE1) 3-1 that is served by the gNB 5 has low priority URLLC data to transmit. UE1 3-1 then performs a CCA in an observation slot at S716, just before an FFP configured for that UE 3-1 commences, and determines that the detected energy is less than a low URLLC ED threshold corresponding to a low L1 (PHY) priority configured at UE1 3-1. UE1 3-1 thus initiates a COT of that UE's FFP at S718 and proceeds to start transmitting data in the uplink to the gNB 5 (e.g. using semi-statically configured resources of a configured grant) as S720. The UE FFP of UE1 3-1 in this example has a greater FFP offset relative to the start of the radio frame than the gNB FFP but a smaller offset than the FFP of UE2 3-2.

At S722 another UE (UE2) 3-2 that is served by the gNB 5 has low priority URLLC data to transmit. UE2 3-2 thus performs a CCA in an observation slot at S724, just before an FFP configured for that UE 3-2 commences, and determines that the detected energy is higher than a low URLLC ED threshold corresponding to a low L1 (PHY) priority configured at UE2 3-2 because of the ongoing transmission(s) of UE1 3-1. UE2 3-2 therefore does not initiate a COT of that UE's FFP and instead its low priority URLLC transmission is effectively blocked at S726. The UE FFP of UE2 3-2 in this example has a greater FFP offset relative to the start of the radio frame than both the gNB FFP and the FFP of UE2 3-2.

At S728, the COT for UE1 3-1 ends and UE1 3-1 enters an idle period of the corresponding FFP. At S730 UE1 3-1 still has low priority URLLC data to transmit and so performs a CCA in the observation slot, just before the next FFP for that UE 3-1 commences, and determines that the detected energy is still less than the low URLLC ED threshold corresponding to the low L1 (PHY) priority configured at UE1 3-1 (because the transmission of UE2 was blocked and so the corresponding channel is still clear). UE1 3-1 thus initiates a COT in the next FFP at S732 and continues to transmit in the uplink to the gNB 5 (e.g. using the semi-statically configured resources of a configured grant) at S734.

At S736 UE2 3-2 now has high priority URLLC data to transmit. UE2 3-2 thus performs a CCA in an observation slot at S738, just before the next FFP configured for that UE 3-2 commences, and determines that the detected energy is lower than a high URLLC ED threshold corresponding to a high L1 (PHY) priority configured at UE2 3-2. Thus, even though the detected energy remains higher than the low URLLC ED threshold corresponding to the low L1 (PHY) priority (because of the ongoing transmission(s) of UE1 3-1), UE2 3-2 initiates a COT of that UE's next FFP at S740 and proceeds to start transmitting the high priority data in the uplink to the gNB 5 (e.g. using semi-statically configured resources of a configured grant) at S742.

The gNB 5 detects the transmission of UE2 3-2 and determines, at S744, that the FFP for UE1 3-1 should be released. The gNB 5 the sends, at S746, an indication that UE1 3-1 should release/cancel its ongoing COT to UE1 3-1 (e.g. using a DCI of a PDCCH). It will be appreciated that while the release indication is shown as being transmitted within a downlink period during the current COT initiated by UE1 it might be received during the idle period of the current UE FFP. Moreover, whilst it is advantageous to receive the indication as early as possible within the COT or idle period of the current FFP it could potentially be received during a COT or idle period of a subsequent FFP.

UE1 3-1 detects the release indication and, at S748, stops its uplink transmission thereby releasing its COT and opening the channel for further transmissions of high priority URLLC data by UE2 3-2.

Once a transmission or service of UE1 3-1 is cancelled, and the corresponding COT released, by means of the downlink release indication, UE1 3-1 does not attempt initiate another COT, for the same transmission or service, until the gNB 5 has rescheduled the UL transmission for that UE 3-1.

UE FFP Configuration

A possible method for configuring FFP(s) for the UE(s) served by the gNB, as described with reference to FIGS. 2 to 4, will now be described, by way of example only, with reference to FIG. 8 which is a simplified timing diagram illustrating a UE FFP configuration procedure.

Figure 8:
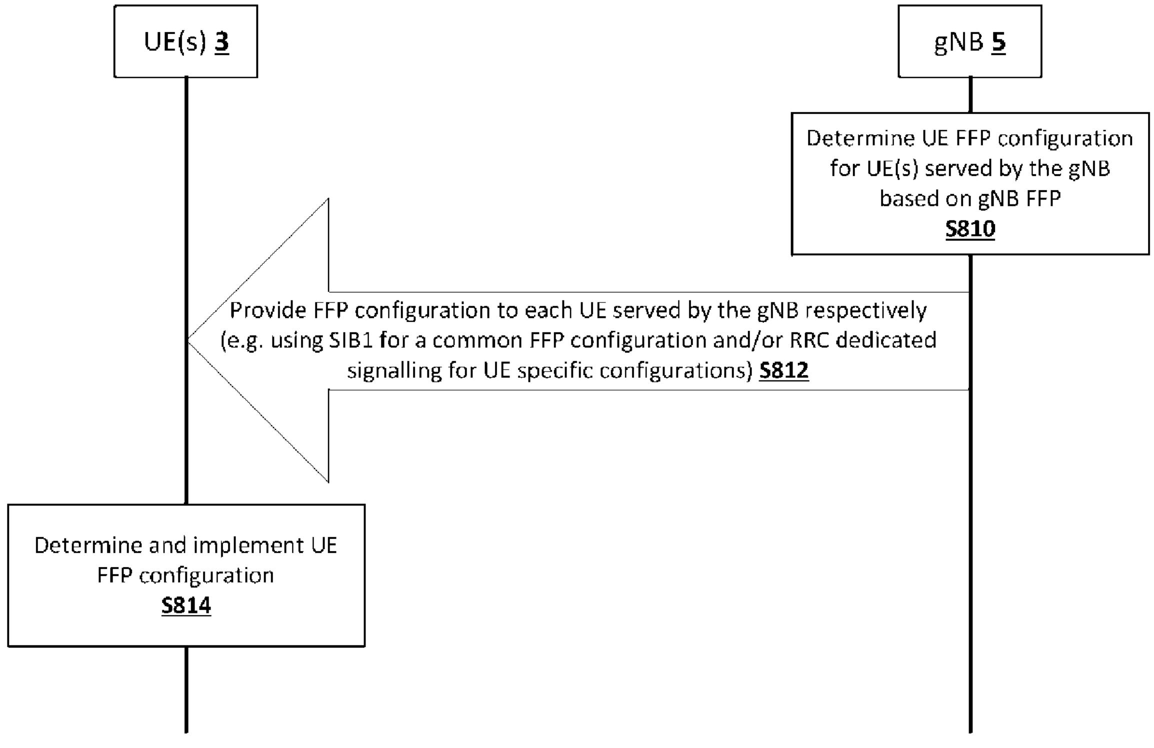
FIG. 8 is a simplified timing diagram illustrating a UE FFP configuration procedure for the system shown in FIG. 1.

As seen in FIG. 8, the gNB 5 determines the FFP configuration for the UE(s) 3 that it serves based on the configuration of the FFP for the gNB 5.

This may involve, for example, configuring the respective FFP offset of each UE 3 that it serves, relative to the start of a radio frame, to be longer than that of the gNB 5 thereby ensuring that the start position of gNB's COT is slightly before that of the UE's start position (as indicated by the value $off_{start}$ in FIGS. 2 to 4). It will be appreciated that a common offset value may be set for a group of two or more UEs (e.g. a group of UEs of a specific type such as URLLC UEs) and/or individual offsets may be set.

Similarly, this may involve configuring the FFPs for the UEs 3 to avoid a UE initiated COT being divided by an idle period of a corresponding gNB FFP, as described with reference to FIG. 3, by ensuring that a UE FFP (or at least the COT part of the UE FFP) does not extend beyond (or does not extend significantly beyond) the end of the gNB FFP.

The UE FFPs, especially for URLLC UEs, may be configured so that the COT part of the UE FFP (at least) does not overlap with a COT part of another UE's FFP. Moreover, the UE FFPs, especially for URLLC UEs, may be configured so that each FFP is fully within the gNB FFP (or does not extend more than a small amount, equivalent to a start offset ($off_{start}$), beyond the end of the gNB FFP).

The periodicity for the UE FFPs may be configured, based on the gNB FFP, to ensure that the periodicity of the gNB FFP is an integer multiple, Np, of the periodicity of a UE FFP as described with reference to FIG. 3 or 4. Similarly the duration for the UE FFPs may be configured, based on the gNB FFP, to ensure that the duration of the gNB FFP is an integer multiple, N, of the duration of the UE FFP as described with reference to FIG. 3 or 4.

At S812, the gNB 5 sends at least part of the UE FFP configuration to the UE(s) 3 that it serves. The FFP offset parameter for configuring the start of the respective FFP for the UE-initiated COT of each UE, relative to a radio frame may, for example, be provided to the UE 3 by dedicated RRC signalling from the gNB 5. The FFP offset parameter could alternatively, or additionally, be provided as a common offset parameter for a group of UEs (e.g. UEs of a specific type, or offering a specific service, such as URLLC) using a system information block (SIB) for example by a type 1 SIB (SIB1).

The UE FFP periodicity may also be explicitly configured using RRC signalling and/or a SIB (e.g. SIB1) or may be determined implicitly at the UE 3 based on other higher layer parameters. It will be appreciated, for example, that UE FFP periodicity and/or duration may be determined implicitly based on other configurations such as random access channel (RACH) configuration parameters, uplink configured grant (CG) configuration parameters or the like. Where the UE FFP periodicity is related to the gNB FFP periodicity by the parameter Np, the UE FFP periodicity may be configured by signalling the value of the integer N to the UEs. Where the UE FFP duration is related to the gNB FFP duration by the parameter N, the UE FFP duration may be configured by signalling the value of the integer N to the UEs.

At S814, each UE 3 determines the UE FFP configuration and implements this configuration for subsequent LBT procedures.

Modifications and Alternatives

Detailed examples of various improvements have been described above. As those skilled in the art will appreciate, a number of modifications and alternatives can be made to the above examples whilst still benefiting from the inventions embodied therein.

For example, it will be appreciated that, whilst the new and beneficial features of the devices of the telecommunication network have been described, in particular, with reference to 5G/NR communication technology, the beneficial features may be implemented in the devices of a telecommunication system that uses other communication technologies such as, for example, other communication technologies developed as part of the 3GPP. For example, whilst the base station and UEs have been described as a 5G base station (gNB) and corresponding UEs it will be appreciated that the features described above may be applied to the RAN nodes (eNBs) and UEs that implement LTE/LTE-Advanced communication technology, or RAN nodes and UEs that implement other communications technologies developed using 3GPP derived communication technologies.

It will be appreciated that the various improvements described above have particular utility when implemented as appropriate in URLLC UEs and in base stations and other apparatus for supporting URLLC UEs. Nevertheless, the improvements may also be implemented in non-URLLC UEs and related apparatus to provide similar benefits.

It will be appreciated that while an example has been described in which different ED thresholds are respectively associated with URLLC data having different priorities, different ED thresholds could also be respectively associated with many other differentiating characteristics such as the type of data, the originator or source of the data, the recipient or target of the data, etc.

In the above examples, the base station uses a 3GPP radio communications (radio access) technology to communicate with the UE. However, any other radio communications technology (i.e. WLAN, Wi-Fi, WiMAX, Bluetooth, etc.) can be used between the base station and the UE in accordance with the above example embodiments. The above example embodiments are also applicable to 'non-mobile' or generally stationary user equipment.

In the above description, the UEs and the base station are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above example embodiments, a number of software modules were described. As those skilled in the art will appreciate, the software modules may be provided in compiled or un-compiled form and may be supplied to the base station, to the mobility management entity, or to the UE as a signal over a computer network, or on a recording medium. Further, the functionality performed by part or all of this software may be performed using one or more dedicated hardware circuits. However, the use of software modules is preferred as it facilitates the updating of the base station or the UE in order to update their functionalities.

Each controller may include any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like. Various other modifications will be apparent to those skilled in the art and will not be described in further detail here.

The base station may include a 'distributed' base station having a central unit 'CU' and one or more separate distributed units (DUs).

The User Equipment (or "UE", "mobile station", "mobile device" or "wireless device") in the present disclosure is an entity connected to a network via a wireless interface.

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may include automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table. This list is not exhaustive and is intended to be indicative of some examples of machine-type communication applications.

TABLE 1

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and example embodiments described in the present document. Needless to say, these technical ideas and example embodiments are not limited to the above-described UE and various modifications can be made thereto.

Various other modifications will be apparent to those skilled in the art and will not be described in further detail here.

The whole or part of the example embodiments disclosed above can be described as, but not limited to, the following supplementary notes.

(Supplementary Note 1)

A method performed by a user equipment (UE) that communicates with a radio access network (RAN), the method including:

maintaining information for configuring timing of fixed frame period (FFPs) for a listen-before-talk (LBT) procedure;

when the UE has data to be transmitted, performing a clear channel assessment, CCA, to determine if a communication channel is clear; and when the CCA indicates that the communication channel is clear:

initiating a channel occupancy time, COT, for the UE within a subsequent FFP;

initiating transmission of the data to be transmitted within the COT;

receiving an indication, from a node of the RAN, that the transmission should be stopped; and ceasing the transmission of the data in response to the received indication.

(Supplementary Note 2)

A method according to supplementary note 1 wherein the indication that the transmission should be stopped is received in a physical downlink control channel (PDCCH), optionally in a downlink control information (DCI) field.

(Supplementary Note 3)

A method according to supplementary note 2 wherein the indication that the transmission should be stopped includes a single bit of the DCI field.

(Supplementary Note 4)

A method according to supplementary note 1 or 2 wherein the indication that the transmission should be stopped indicates that at least one configured grant for the UE is to be deactivated.

(Supplementary Note 5)

A method according to supplementary note 4 wherein the indication that the transmission should be stopped includes at least one index of a configured grant that is to be deactivated.

(Supplementary Note 6)

A method according to supplementary note 4 wherein the indication that the transmission should be stopped includes a bitmap, wherein each bit of the bitmap respectively corresponds to a configured grant for the UE, and wherein each bit of the bitmap is respectively set to indicate whether the corresponding configured grant is to be deactivated.

(Supplementary Note 7)

A method according to any one of supplementary notes 1 to 6 wherein the indication that the transmission should be stopped is received during a UE initiated COT.

(Supplementary Note 8)

A method according to any one of supplementary notes 1 to 7 wherein following receipt of the indication that the transmission should be stopped and subsequent cessation of transmission, attempts initiate another COT, for the same transmission are suspended until transmission is rescheduled by the node of the RAN.

(Supplementary Note 9)

A method performed by a user equipment (UE) that communicates with a radio access network (RAN), the method including:

maintaining information for configuring timing of fixed frame period (FFPs) and a plurality of energy detection (ED) thresholds, for a listen-before-talk (LBT) procedure, wherein each ED threshold of the plurality of thresholds is associated a different respective possible data characteristic that data transmitted by the UE may have;

when the UE has data to be transmitted, performing a clear channel assessment, CCA, to determine if a communication channel is clear, wherein the CCA includes comparing a detected energy level with an ED threshold of the plurality of ED thresholds that is associated with a corresponding characteristic of the data to be transmitted; and when the CCA indicates that the communication channel is clear:

initiating a channel occupancy time, COT, for the UE within a subsequent FFP; and initiating transmission of the data to be transmitted within the COT.

(Supplementary Note 10)

A method according to supplementary note 9 wherein the different respective possible data characteristics with which the plurality of thresholds is associated include a plurality of different priorities and wherein each ED threshold of the plurality of thresholds is associated a different respective priority.

(Supplementary Note 11)

A method performed by a radio access network (RAN) that serves a plurality of user equipments (UEs), each UE being respectively configured with fixed frame period (FFPs) for a listen-before-talk (LBT) procedure the method including:

receiving data transmitted by a first UE of the plurality of UEs during a first channel occupancy time, COT, initiated by the first UE within an FFP with which the first UE is configured;

receiving a transmission by a second UE of the plurality of UEs during a second COT initiated by the second UE within an FFP with which the second UE is configured, wherein the transmission by the second UE is received during the first COT initiated by the first UE;

determining, based on the transmission by the second UE, whether transmission by the first UE should be stopped; and when it is determined that transmission by the first UE should be stopped:

transmitting, to the first UE, an indication that transmission by the first UE should be stopped.

(Supplementary Note 12)

A method according to supplementary note 11 wherein the transmission by the second UE is a transmission of data that has a higher priority than the data transmitted by the first UE.

(Supplementary Note 13)

A method according to supplementary note 11 wherein the transmission by the second UE is a transmission of a scheduling request for a subsequent transmission of data that has a higher priority than the data transmitted by the first UE.

(Supplementary Note 14)

A method performed by a radio access network (RAN) that serves at least one user equipment (UE), each UE being respectively configured with fixed frame period (FFPs) for a listen-before-talk (LBT) procedure the method including:

providing configuration information to each UE for at least partially configuring timing of respective fixed frame period (FFPs) for a listen-before-talk (LBT) procedure in which each UE is respectively able to initiate a channel occupancy time (COT) of an FFP for that UE subject to a clear channel assessment (CCA);

wherein the configuration information provided by the radio access network (RAN) is configured for configuring a respective timing for the FFPs of each UE that is based on a corresponding FFP of the node of the RAN.

(Supplementary Note 15)

A method according to supplementary note 14 wherein the configuration information provided by the radio access network (RAN) is configured for ensuring at least one of the following, based on the corresponding FFP of the node of the RAN:

a respective timing for the FFPs of each UE in which none of the FFPs for a UE overlap with an end of the corresponding FFP of the node of the RAN by more than a time period corresponding to an idle period for the FFPs of that UE;

a respective timing for the FFPs of each UE in which all of the FFPs for a UE occur within the corresponding FFP of the node of the RAN without extending beyond the end of the corresponding FFP of the node of the RAN by more than a time period corresponding to an idle period for the FFPs of the UE;

a respective timing for the FFPs of each UE in which at least a COT part of the FFPs for each UE do not coincide with at least a COT part of the FFPs for another UE served by the node of the RAN;

a respective duration for at least one of the FFPs of each UE that is equal to a duration of the corresponding FFP of the node of the RAN divided by an integer divisor; or a respective periodicity for the FFPs of each UE that is equal to a periodicity of the corresponding FFP of the node of the RAN divided by an integer divisor.

(Supplementary Note 16)

A method according to supplementary note 14 or 15 wherein the configuration information provided by the radio access network (RAN) is arranged for configuring at least one respective duration for at least one of the FFPs of each UE that is equal to the duration of the corresponding FFP of the node of the RAN divided by an integer divisor, and wherein both the respective duration for at least one of the FFPs of each UE and the duration of the corresponding FFP of the node of the RAN are integer multiples of a minimum period.

(Supplementary Note 17)

A method performed by a user equipment (UE) that communicates with a radio access network (RAN), the method including:

receiving configuration information from a node of the RAN for at least partially configuring timing of fixed frame period (FFPs), for a listen-before-talk (LBT) procedure for the UE, wherein the UE is able to initiate a respective channel occupancy time (COT) in each FFP subject to a clear channel assessment (CCA); and determining the timing of the FFPs for the UE based on the received configuration information;

wherein the UE determines a timing for the FFPs of the UE, based on the received configuration information, that is based on a corresponding FFP of the node of the RAN.

(Supplementary Note 18)

A method according to supplementary note 17 wherein the UE determines a timing for the FFPs of the UE, based on the received configuration information in which at least one of the following applies:

none of the FFPs for the UE overlap with an end of the corresponding FFP of the node of the RAN by more than a time period corresponding to an idle period for the FFPs of the UE;

all of the FFPs for the UE occur within the corresponding FFP of the node of the RAN without extending beyond the end of the corresponding FFP of the node of the RAN by more than a time period corresponding to an idle period for the FFPs of the UE;

at least a COT part of the FFPs for the UE do not coincide with at least a COT part of the FFPs for another UE served by the node of the RAN;

a respective duration for at least one of the FFPs of the UE is equal to a duration of a corresponding FFP of the node of the RAN divided by an integer divisor; or a respective periodicity for the FFPs of the UE is equal to a periodicity of the corresponding FFP of the node of the RAN divided by an integer divisor.

(Supplementary Note 19)

A user equipment (UE) for communicating with a radio access network (RAN), the UE including:

a controller and a transceiver wherein the controller is configured:

to maintain information for configuring timing of fixed frame period (FFPs) for a listen-before-talk (LBT) procedure;

to, when the UE has data to be transmitted, perform a clear channel assessment, CCA, to determine if a communication channel is clear; and when the CCA indicates that the communication channel is clear:

to initiate a channel occupancy time, COT, for the UE within a subsequent FFP;

to control the transceiver to initiate transmission of the data to be transmitted within the COT;

to control the transceiver to receive an indication, from a node of the RAN, that the transmission should be stopped; and to control the transceiver to cease the transmission of the data in response to the received indication.

(Supplementary Note 20)

A user equipment (UE) for communicating with a radio access network (RAN), the UE including:

a controller and a transceiver wherein the controller is configured:

to maintain information for configuring timing of fixed frame period (FFPs) and a plurality of energy detection (ED) thresholds, for a listen-before-talk (LBT) procedure, wherein each ED threshold of the plurality of thresholds is associated a different respective possible data characteristic that data transmitted by the UE may have;

to, when the UE has data to be transmitted, perform a clear channel assessment, CCA, to determine if a communication channel is clear, wherein the CCA includes comparing a detected energy level with an ED threshold of the plurality of ED thresholds that is associated with a corresponding characteristic of the data to be transmitted; and when the CCA indicates that the communication channel is clear:

to initiate a channel occupancy time, COT, for the UE within a subsequent FFP; and to control the transceiver to initiate transmission of the data to be transmitted within the COT.

(Supplementary Note 21)

A node of a radio access network (RAN) that serves a plurality of user equipments (UEs), each UE being respectively configured with fixed frame period (FFPs) for a listen-before-talk (LBT) procedure the node of the RAN including:

a controller and a transceiver wherein the controller is configured:

to control the transceiver to receive data transmitted by a first UE of the plurality of UEs during a first channel occupancy time, COT, initiated by the first UE within an FFP with which the first UE is configured;

to control the transceiver to receive a transmission by a second UE of the plurality of UEs during a second COT initiated by the second UE within an FFP with which the second UE is configured, wherein the transmission by the second UE is received during the first COT initiated by the first UE;

to determine, based on the transmission by the second UE, whether transmission by the first UE should be stopped; and when it is determined that transmission by the first UE should be stopped:

to control the transceiver to transmit, to the first UE, an indication that transmission by the first UE should be stopped.

(Supplementary Note 22)

A node of a radio access network (RAN) that serves a plurality of user equipments (UEs), each UE being respectively configured with fixed frame period (FFPs) for a listen-before-talk (LBT) procedure the node of the RAN including:

a controller and a transceiver wherein the controller is configured:

to provide configuration information to each UE for at least partially configuring timing of respective fixed frame period (FFPs) for a listen-before-talk (LBT) procedure in which each UE is respectively able to initiate a channel occupancy time (COT) of an FFP for that UE subject to a clear channel assessment (CCA);

wherein the configuration information provided by the radio access network (RAN) is configured for configuring a respective timing for the FFPs of each UE that is based on a corresponding FFP of the node of the RAN.

(Supplementary Note 23)

A node of a radio access network (RAN) according to supplementary note 22 wherein the configuration information provided by the radio access network (RAN) is configured for ensuring at least one of the following, based on the corresponding FFP of the node of the RAN:

a respective timing for the FFPs of each UE in which none of the FFPs for a UE overlap with an end of the corresponding FFP of the node of the RAN by more than a time period corresponding to an idle period for the FFPs of that UE;

a respective timing for the FFPs of each UE in which all of the FFPs for a UE occur within the corresponding FFP of the node of the RAN without extending beyond the end of the corresponding FFP of the node of the RAN by more than a time period corresponding to an idle period for the FFPs of the UE;

a respective timing for the FFPs of each UE in which at least a COT part of the FFPs for each UE do not coincide with at least a COT part of the FFPs for another UE served by the node of the RAN;

a respective duration for at least one of the FFPs of each UE that is equal to a duration of the corresponding FFP of the node of the RAN divided by an integer divisor; or a respective periodicity for the FFPs of each UE that is equal to a periodicity of the corresponding FFP of the node of the RAN divided by an integer divisor.

(Supplementary Note 24)

A user equipment (UE) for communicating with a radio access network (RAN), the UE including:

a controller and a transceiver wherein the controller is configured:

to control the transceiver to receive configuration information from a node of the RAN for at least partially configuring timing of fixed frame period (FFPs), for a listen-before-talk (LBT) procedure for the UE, wherein the UE is able to initiate a respective channel occupancy time (COT) in each FFP subject to a clear channel assessment (CCA); and to determine the timing of the FFPs for the UE based on the received configuration information;

wherein the controller is configured to determine a timing for the FFPs of the UE, based on the received configuration information, that is based on a corresponding FFP of the node of the RAN.

(Supplementary Note 25)

A UE according to supplementary note 24 wherein the controller is configured to determine a timing for the FFPs of the UE, based on the received configuration information in which at least one of the following applies:

none of the FFPs for the UE overlap with an end of the corresponding FFP of the node of the RAN by more than a time period corresponding to an idle period for the FFPs of the UE;

all of the FFPs for the UE occur within the corresponding FFP of the node of the RAN without extending beyond the end of the corresponding FFP of the node of the RAN by more than a time period corresponding to an idle period for the FFPs of the UE;

at least a COT part of the FFPs for the UE do not coincide with at least a COT part of the FFPs for another UE served by the node of the RAN;

a respective duration for at least one of the FFPs of the UE is equal to a duration of a corresponding FFP of the node of the RAN divided by an integer divisor; or a respective periodicity for the FFPs of the UE is equal to a periodicity of the corresponding FFP of the node of the RAN divided by an integer divisor.

This application is based upon and claims the benefit of priority from United Kingdom Patent Application No. 2016472.9, filed on Oct. 16, 2020, the disclosure of which is incorporated herein in its entirety by reference.

What is claimed is:

1. A method performed by a user equipment (UE) operating in a semi-static channel access mode, the method comprising:

receiving, from an access network node operating in the semi-static channel access mode, configuration information for configuring a period of a channel occupancy that the UE initiates in a fixed frame period (FFP), for a listen-before-talk (LBT) procedure;

performing a clear channel assessment (CCA) in accordance with the period;

initiating the period of the channel occupancy for the UE in a case where the CCA indicates that a communication channel is clear;

receiving, from the access network node, first downlink control information (DCI); and determining, based on the first DCI, whether to cancel an uplink transmission scheduled by the access network node within a subsequent FFP of the channel occupancy initiated by the UE.

2. The method according to claim 1, wherein the configuration information includes information indicating the period and information indicating a start of the period within a radio frame that the UE initiates the channel occupancy.

3. The method according to claim 1, wherein a FFP for a channel occupancy that the access network node initiates is an integer N multiple of the FFP for the channel occupancy that the UE initiates.

4. The method according to claim 1, further comprising:

receiving downlink transmission from the access network node, wherein the downlink transmission includes another data transmission for another UE.

5. The method according to claim 1, wherein:

the configuration information includes a plurality of energy detection (ED) thresholds for the LBT, each of the plurality of ED thresholds corresponds to data characteristic that data transmitted by the UE may have, and the performing the CCA is performed using one of the plurality of the ED thresholds based on the data characteristic that the data to be transmitted by the UE.

6. The method according to claim 5, wherein the data characteristic includes a priority.

7. The method according to claim 4, wherein the another data transmission includes an indication that the transmission, from the another UE, should be stopped.

8. A method performed by an access network node operating in a semi-static channel access mode, the method comprising:

transmitting, to a user equipment (UE) operating in the semi-static channel access mode, configuration information for configuring a period of a channel occupancy that the UE initiates in a fixed frame period (FFP), for a listen-before-talk (LBT) procedure;

wherein the period is used by the UE for performing a clear channel assessment (CCA)); and transmitting, to the UE, first downlink control information (DCI) and initiating the period of the channel occupancy for the UE in a case where the CCA indicates that a communication channel is clear, wherein whether to cancel an uplink transmission scheduled by the access network node within a subsequent FFP of the channel occupancy initiated by the UE is determined based on the DCI.

9. The method according to claim 8, wherein the configuration information includes information indicating the period and information indicating a start of the period within a radio frame that the UE initiates the channel occupancy.

10. The method according to claim 8, wherein a FFP for a channel occupancy that the access network node initiates is an integer N multiple of the FFP for the channel occupancy that the UE initiates.

11. The method according to claim 8, further comprising:

transmitting downlink transmission to the UE, wherein the downlink transmission includes another data transmission for another UE.

12. The method according to claim 8, wherein:

the configuration information includes a plurality of energy detection (ED) thresholds for the LBT, each of the plurality of ED thresholds corresponds to data characteristic that data transmitted by the UE may have, and one of the plurality of the ED thresholds is used by the UE for performing the CCA based on the data characteristic that the data to be transmitted by the UE.

13. The method according to claim 12, wherein the data characteristic includes a priority.

14. The method according to claim 11, wherein the another data transmission includes an indication that the transmission from the another UE should be stopped.

15. A user equipment (UE) operating in a semi-static channel access mode, the UE comprising:

a memory storing instructions; and at least one processor configured to process the instructions to:

receive, from an access network node operating in the semi-static channel access mode, configuration information for configuring a period of a channel occupancy that the UE initiates in a fixed frame period (FFP), for a listen-before-talk (LBT) procedure;

perform a clear channel assessment (CCA) in accordance with the period;

initiate the period of the channel occupancy for the UE in a case where the CCA indicates that a communication channel is clear;

receive, from the access network node, first downlink control information (DCI); and determine, based on the first DCI, whether to cancel an uplink transmission scheduled by the access network node within a subsequent FFP of the channel occupancy initiated by the UE.

16. An access network node operating in a semi-static channel access mode, the access network node comprising:

a memory storing instructions; and at least one processor configured to process the instructions to:

transmit, to a user equipment (UE) operating in the semi-static channel access mode, configuration information for configuring a period of a channel occupancy that the UE initiates in a fixed frame period (FFP), for a listen-before-talk (LBT) procedure;

wherein the period is used by the UE for performing a clear channel assessment (CCA); and transmit, to the UE, first downlink control information (DCI) and initiating the period of the channel occupancy for the UE in a case where the CCA indicates that a communication channel is clear, wherein whether to cancel an uplink transmission scheduled by the access network node within a subsequent FFP of the channel occupancy initiated by the UE is determined based on the DCI.

* * * * *